(12) United States Patent
Takakura et al.

(10) Patent No.: US 7,627,036 B2
(45) Date of Patent: Dec. 1, 2009

(54) MOTION VECTOR DETECTION DEVICE AND MOVING PICTURE CAMERA

(75) Inventors: Kentaro Takakura, Takatsuki (JP); Shinji Kitamura, Nagaokakyo (JP)

(73) Assignee: Panasonic Corporation, Osaka (JP)

( * ) Notice: Subject to any disclaimer, the term of this patent is extended or adjusted under 35 U.S.C. 154(b) by 1099 days.

(21) Appl. No.: 11/000,973

(22) Filed: Dec. 2, 2004

(65) Prior Publication Data
US 2005/0163220 A1    Jul. 28, 2005

(30) Foreign Application Priority Data
Jan. 26, 2004    (JP)    ............................. 2004-017674

(51) Int. Cl.
*H04N 7/12*    (2006.01)
(52) U.S. Cl. ................................. 375/240.16
(58) Field of Classification Search ............ 375/240.01, 375/240.16, 240.24, 240.26; *H04N 7/12*
See application file for complete search history.

(56) References Cited

U.S. PATENT DOCUMENTS

| 5,173,771 | A | 12/1992 | Kitazato |
| 6,674,798 | B2 | 1/2004 | Ishihara et al. |

FOREIGN PATENT DOCUMENTS

| JP | 61-052756 | 3/1986 |
| JP | 05-014870 | 1/1993 |
| JP | 06-276510 | 9/1994 |
| JP | 07-298264 | 11/1995 |

OTHER PUBLICATIONS

Japanese Office Action issued in Japanese Patent Application No. JP 2004-017674 dated on Nov. 25, 2008.

*Primary Examiner*—Young Lee
(74) *Attorney, Agent, or Firm*—McDermott Will & Emery LLP

(57) ABSTRACT

A motion vector detection device that detects a motion vector of an object block in an object frame with reference to a reference frame, including: a reference frame storing unit that stores a reference frame consisting of a predetermined number of reference blocks; an object block storing unit that stores an object block included in an object frame; a reference block storing unit that includes a detection area which stores reference blocks including a reference block corresponding to the object block, and a preparatory area; a writing unit that reads a reference block that is not stored in the detection area among reference blocks including a reference block corresponding to a succeeding object block, and writes the read reference block into the preparatory area; and a detection unit that detects the motion vector with reference to the reference block.

10 Claims, 25 Drawing Sheets

FIG.12A

|   |   |   |   |
|---|---|---|---|
|   | 1 | 2 |   |
|   | 9 | 10|   |

FIG.12B — 13

|   |   |   |   |
|---|---|---|---|
|   | 1 | 2 | 3 |
|   | 9 | 10| 11|

FIG.12C — 15

|   |   |   |   |
|---|---|---|---|
| 4 | 1 | 2 | 3 |
| 12| 9 | 10| 11|

FIG.12D — 17b, 17a

|   |   |   |   |
|---|---|---|---|
| 4 | 5 | 2 | 3 |
| 12| 13| 10| 11|

FIG.12E — 19b, 19a

|   |   |   |   |
|---|---|---|---|
| 4 | 5 | 6 | 3 |
| 12| 13| 14| 11|

FIG.12F — 21

|   |   |   |   |
|---|---|---|---|
| 4 | 5 | 6 | 7 |
| 12| 13| 14| 15|

| 4 | 6 | 6 | 6 | 6 | 6 | 6 | 4 |
|---|---|---|---|---|---|---|---|
| 6 | 9 | 9 | 9 | 9 | 9 | 9 | 6 |
| 6 | 9 | 9 | 9 | 9 | 9 | 9 | 6 |
| 6 | 9 | 9 | 9 | 9 | 9 | 9 | 6 |
| 6 | 9 | 9 | 9 | 9 | 9 | 9 | 6 |
| 6 | 9 | 9 | 9 | 9 | 9 | 9 | 6 |
| 6 | 9 | 9 | 9 | 9 | 9 | 9 | 6 |
| 4 | 6 | 6 | 6 | 6 | 6 | 6 | 4 |

TOTAL 484

340

| 4 | 2 | 2 | 2 | 2 | 2 | 2 | 0 |
|---|---|---|---|---|---|---|---|
| 6 | 3 | 3 | 3 | 3 | 3 | 3 | 0 |
| 6 | 3 | 3 | 3 | 3 | 3 | 3 | 0 |
| 6 | 3 | 3 | 3 | 3 | 3 | 3 | 0 |
| 6 | 3 | 3 | 3 | 3 | 3 | 3 | 0 |
| 6 | 3 | 3 | 3 | 3 | 3 | 3 | 0 |
| 6 | 3 | 3 | 3 | 3 | 3 | 3 | 0 |
| 4 | 2 | 2 | 2 | 2 | 2 | 2 | 0 |

TOTAL 176

FIG.22

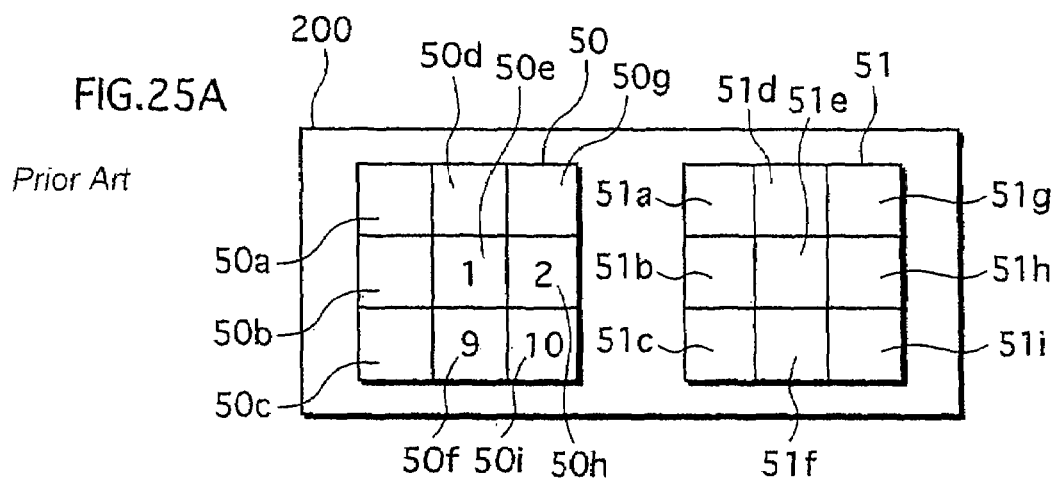
FIG.25A *Prior Art*
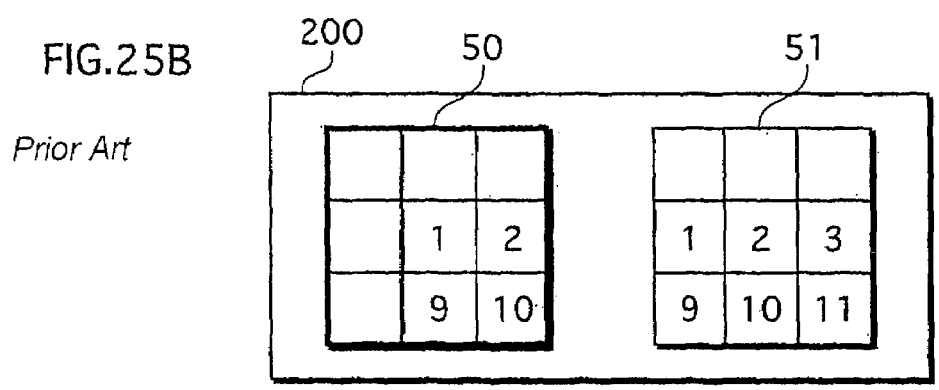
FIG.25B *Prior Art*
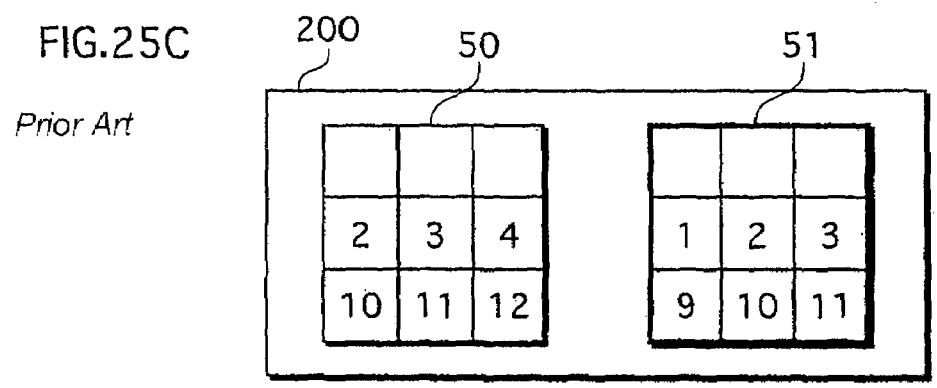
FIG.25C *Prior Art*
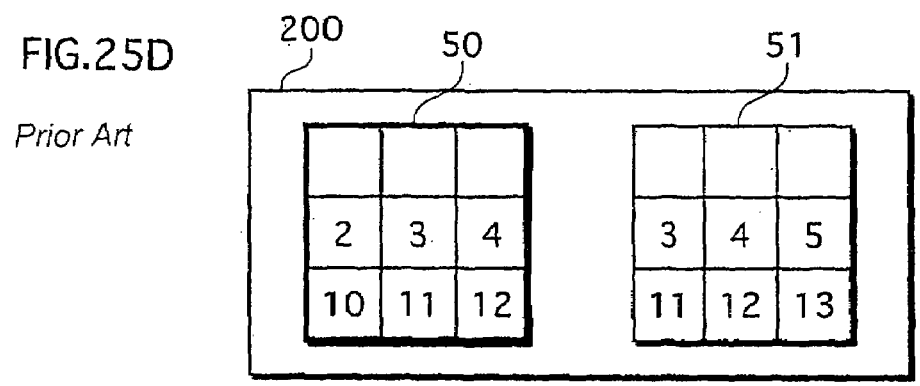
FIG.25D *Prior Art*

MOTION VECTOR DETECTION DEVICE AND MOVING PICTURE CAMERA

This application is based on an application No. 2004-017674 filed in Japan, the content of which is hereby incorporated by reference.

BACKGROUND OF THE INVENTION (1) Field of the Invention

The present invention relates to a technique for detecting a motion vector in a motion-compensated predictive coding, which is one of compression methods for a moving picture.

(2) Description of the Related Art

In recent years, a technique for compressing an image at high compression ratio has been developed. This technique is used for digital cameras and digital video cameras.

MPEG (Moving Picture Experts Group) is generally known as a compression method for a moving picture. In MPEG, motion-compensated prediction is used for efficiently compressing image data, by which only displacements and difference data of an object image are encoded. In this motion-compensated prediction, a motion vector, which indicates the displacements of the object image, is calculated with use of several methods, such as a block-matching method.

PATENT DOCUMENT 1 discloses a reference image data buffer including a first bank and a second bank. Forty-three block images as a unit of processing, which are disposed in the horizontal direction in a reference frame image, are written into the first bank. Each block image consists of 16 pixels×8 lines. The image data stored in the first bank is read out for calculating a motion vector. At the same time, the succeeding unit of processing in the reference frame image, which is to be processed next, is written into the second bank. Then, the first bank takes over the role of the second bank, and vice versa. The image data stored in the second bank is read out for calculating a motion vector, and at the same time, image data in the succeeding unit of processing in the reference frame image is written into the first bank. These operations are performed repeatedly.

The following is a description of the method disclosed in the PATENT DOCUMENT 1 based on an assumption that the capacity of the reference image data buffer is as small as possible. More specifically, one frame image is assumed to consist of 128 pixels ×128 lines of image data. One frame image is equally divided into sixty-four (8×8) macroblocks. In such a frame, macroblocks are numbered from left to right and top to bottom. One macroblock includes 16 pixels×16 lines of image data. In the following description, the numbers for macroblocks are called "block numbers". Also, a macroblock having a block number "n" included in the reference frame image is called a reference block "n", and a macroblock having a block number "n" included in an object frame image is called an object block "n", and so on. Further, macroblocks constituting a reference frame image are called reference blocks, and macroblocks constituting an object frame image are called object blocks.

As FIG. 25A shows, a reference image data buffer 200 includes a first bank 50 and a second bank 51. Each bank consists of 9 areas, and each area has a capacity for storing one macroblock.

In the detection of a motion vector of one object block, a "reference area" means an area in a reference frame image including 3 rows×3 columns of reference blocks in such a manner that a reference block having the same number as the object block is included in the center of the reference blocks. A reference frame image is stored in a reference frame memory.

Firstly, as FIG. 25A shows, areas 50e, 50f, 50h, and 50i in the first bank 50 store a reference block "1", a reference block "2", a reference block "9", and a reference block "10" respectively. These reference blocks are included in a reference area of an object block "1".

Next, as FIG. 25B shows, the motion vector is detected in the reference blocks stored in the first bank. At the same time, reference blocks "1", "2", "3", "9", "10", and "11" included in a reference area of an object block "2" are transferred from the reference frame memory to areas 51e to 51i in the second bank 51 respectively.

Next, the first bank 50 takes over the role of the second bank 51, and vice versa. Then, as FIG. 25C shows, reference blocks "2", "3", "4", "10", "11", and "12" included in a reference area of an object block "3" are transferred from the reference frame memory to areas 50d to 50i in the first bank 50 respectively. In parallel with this, the motion vector is detected in the reference blocks stored in the second bank 51.

The operations for detecting motion vectors are performed repeatedly as described above.

Here, in FIG. 25B, the reference block "2" stored in the area 50h of the first bank 50 and the reference block "2" stored in the area 51e of the second bank 51 are redundant. Also, the reference block "10" stored in the area 50i of the first bank 50 and the reference block "10" stored in the area 51f of the second bank 51 are redundant. Also in FIG. 25C, the reference block "2", the reference block "3", the reference block "10" and the reference block "11" are stored in both the first bank 50 and the second bank 51.

Reference blocks stored in the reference image data buffer 200 are transferred from the reference frame memory as needed. Therefore, in the case described above, the same data is transferred several times from the reference frame memory to the reference image data buffer, which is inefficient.

SUMMARY OF THE INVENTION

The object of the present invention is therefore to provide a motion vector detection device, a motion vector detection method, and a moving picture camera capable of reducing redundant data transfer from a reference frame memory to a reference image data buffer.

The above object is fulfilled by a motion vector detection device that detects a motion vector of an object block included in an object frame with reference to a reference frame, comprising: a reference frame storing unit operable to store a reference frame consisting of a predetermined number of reference blocks; an object block storing unit operable to store an object block included in an object frame; a reference block storing unit including a detection area and a preparatory area, the detection area storing a plurality of reference blocks including a reference block corresponding to the object block; a writing unit operable to read, among a plurality of reference blocks including a reference block corresponding to a succeeding object block, one or more reference blocks that are not stored in the detection area, and write the read reference blocks into the preparatory area, the succeeding object block adjoining the object block; and a detection unit operable to detect a motion vector of the object block with reference to the reference blocks stored in the detection area.

With the stated structure, the reference block storing unit includes the preparatory area, and the writing unit writes, among the plurality of the reference blocks including the reference block corresponding to the succeeding object block, only the reference block not stored in the detection area into the preparatory area. Therefore, the motion vector detection device according to the present invention can transfer the reference block required for detecting the motion vector of the succeeding object block from the reference frame storing unit to the reference block storing unit in such a manner that there is no redundancy between the previously read reference blocks for detecting the motion vector of the object block and the reference blocks for detecting the motion vector of the succeeding object block.

The detection unit may detect the motion vector of the object block in parallel with the writing performed by the writing unit.

With the stated function, the processing speed of the motion vector detection becomes higher.

The above object is fulfilled by a motion vector detection device that detects a motion vector of an object block included in an object frame based on a reference frame, comprising: a reference frame storing unit operable to store a reference frame consisting of a predetermined number of reference blocks; an object block storing unit operable to store an object block included in an object frame; a reference block storing unit operable to store a plurality of reference blocks including a reference block corresponding to the object block; a setting unit operable to set a detection area and a preparatory area in the reference block storing unit based on a position of the object block in the object frame, the detection area storing the plurality of the reference blocks including the reference block corresponding to the object block; a writing unit operable to read, among a plurality of reference blocks including a reference block corresponding to a succeeding object block, one or more reference blocks that are not stored in the detection area, and write the read reference blocks into the preparatory area, the succeeding object block adjoining the object block; and a detection unit operable to detect a motion vector of the object block based on the reference blocks stored in the detection area.

With the stated structure, any area in the reference block storing unit can be set as the detection area. This means that the motion vectors of the adjoining object blocks in the object frame can be detected consecutively.

The detection unit may detect the motion vector of the object block in parallel with the writing performed by the writing unit.

With the stated function, the processing speed of the motion vector detection becomes higher.

The setting unit may set the detection area so that the reference block corresponding to the object block is placed in the center of the detection area.

With the stated function, the motion vector of each object block can be detected accurately.

Each reference block stored in the reference block storing unit may be identified by a physical address indicating a position of the reference block stored in the reference block storing unit, and the detection unit may include: a specification unit operable to specify a logical address indicating a position of the reference block in the detection area; a conversion unit operable to convert the logical address into the physical address; a reading unit operable to read the reference block identified by the physical address from the reference block storing unit per pixel; a repeat control unit operable to control the specification unit, the conversion unit, and the reading unit repeatedly to perform the specification, the conversion, and the reading on all the reference blocks in the detection area; and a calculation unit operable to calculate the motion vector of the object block with use of the read reference block and the object block.

With the stated function, the motion vector can be detected no matter where in the reference block storing unit the detection area is placed. This takes full advantage of the reference block storing unit.

The reference block storing unit may store the plurality of reference blocks including the reference block corresponding to the object block that adjoins an edge of the object frame, the setting unit sets the plurality of reference blocks including the reference block corresponding to the object block as a calculation range in the detection area, and the detection unit detects the motion vector based on the reference blocks included in the calculation range in the detection area.

With the stated structure, the motion vector of the object block image that adjoins the edge of the object frame can be detected accurately.

The reference frame storing unit may include a plurality of memory elements disposed in a shape of a matrix, a position of each memory element being specified by a row address and a column address, each reference block constituting the reference frame being stored in a plurality of memory elements whose positions are specified by a same row address, and the writing unit may read the reference block from the plurality of the memory elements whose positions are specified by the same row address.

With the stated structure, the reference block image can be read out at a high speed by fixing one row address and specifying only column addresses sequentially.

The reference block storing unit may include an area for storing 3 rows and 4 columns of the reference blocks, and the setting unit may set the detection area for storing 3 rows and 3 columns of the reference blocks, and the preparatory area for storing 3 rows and 1 column of the reference blocks.

With the stated structure, the motion vectors of the object blocks constituting one row of the object frame image can be detected consecutively.

The reference block storing unit may include an area for storing 3 rows and 5 columns of the reference blocks, and the setting unit may set the detection area for storing 3 rows and 3 columns of the reference blocks, and the preparatory area for storing 3 rows and 2 columns of the reference blocks.

With the stated structure, the motion vectors of the object blocks constituting one object frame can be detected consecutively.

Patent Document 1

Japanese Laid-Open Patent Publication No. 3-85884 (U.S. Pat. No. 5,173,771).

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings:

FIGS. 12A through 12F show a transition of a detection area in a reference image data buffer 134;

FIG. 13 shows an effect of the first embodiment;

FIG. 22 is an example reference frame stored in a reference frame memory 131 in modification (1);

FIGS. 25A through 25D show a structure of a reference image data buffer 200 using a conventional technology and a transition of a detection area thereof.

DESCRIPTION OF THE PREFERRED EMBODIMENTS

1. The First Embodiment

The following describes a moving picture camera 100 according to a preferred embodiment of the present invention.

1.1 Structure of Moving Picture Camera 100

Figure 1:
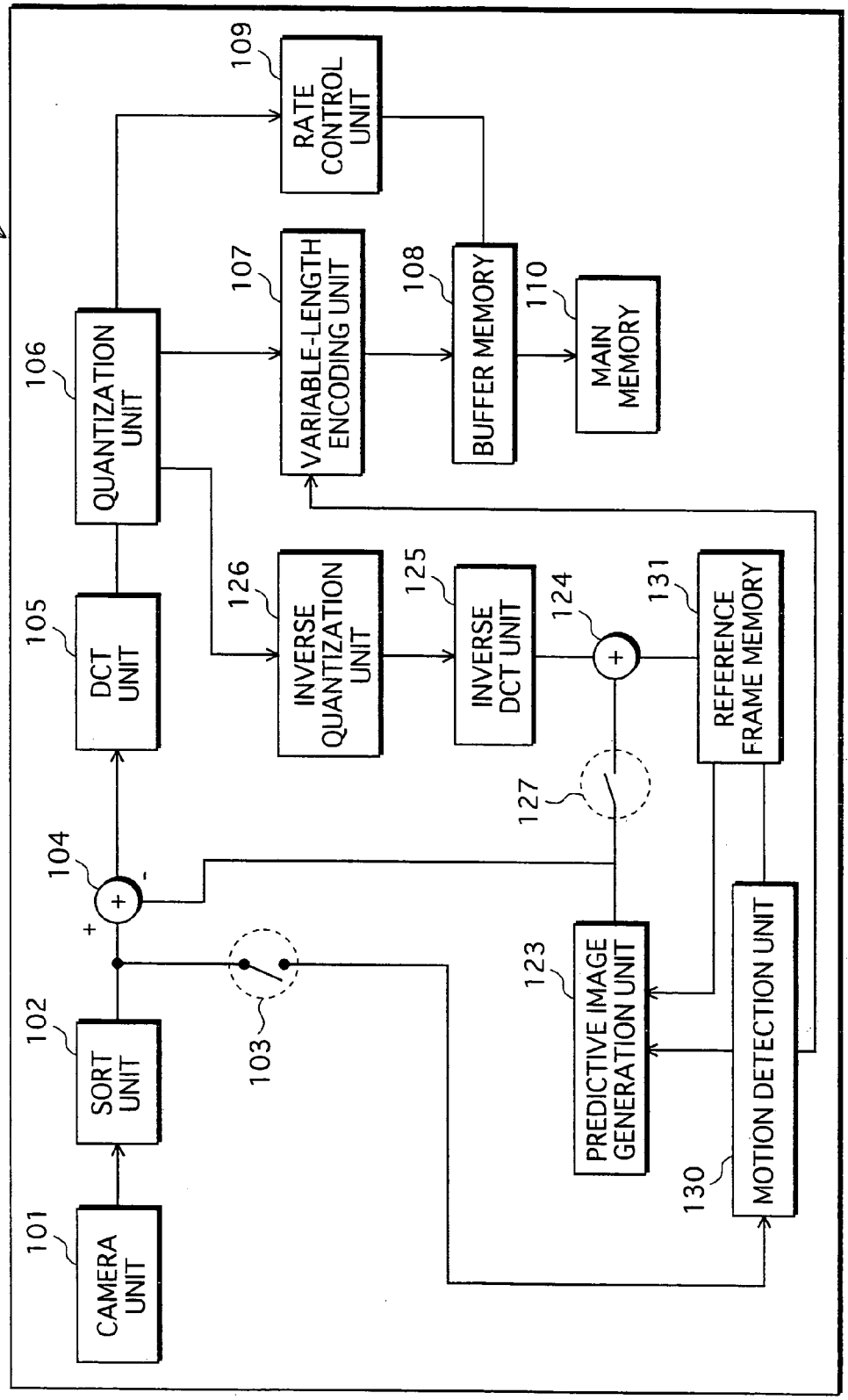
FIG. 1 is a block diagram showing a structure of a moving picture camera 100.

As FIG. 1 shows, a moving picture camera 100 includes a camera unit 101, a sort unit 102, a switch 103, a subtraction unit 104, a DCT unit 105, a quantization unit 106, a variable-length encoding unit 107, a buffer memory 108, a rate control unit 109, a main memory 110, a predictive image generation unit 123, an addition unit 124, an inverse DCT unit 125, an inverse quantization unit 126, a switch 127, a motion detection unit 130, and a reference frame memory 131.

The camera unit 101 generates a frame image signal consisting of 128 pixels×128 lines from detected lights at regular time intervals. Based on the generated frame image signal, the camera unit 101 generates a frame image consisting of a luminance signal Y and color difference signals Cr and Cb. Then, the camera unit 101 outputs the frame image to the sort unit 102.

Figure 2:
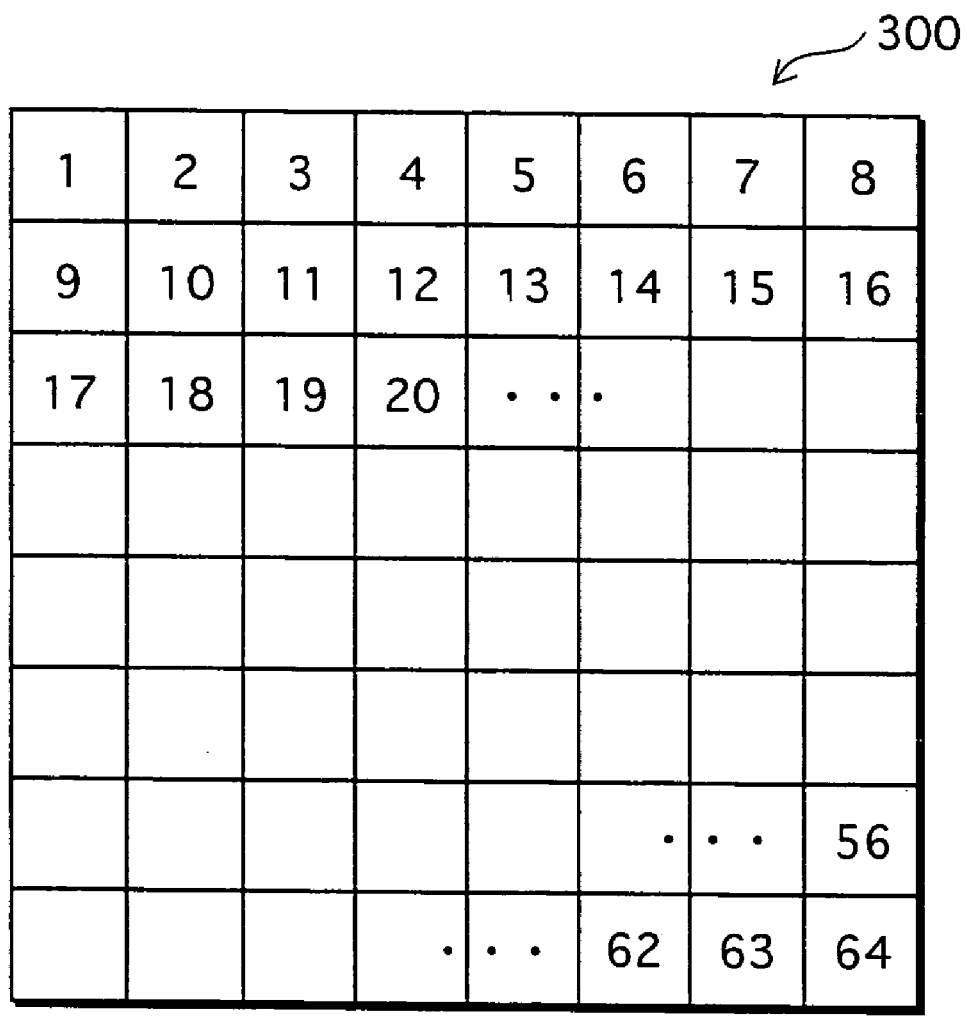
FIG. 2 is an example of a frame image processed by a moving picture camera 100.

The sort unit 102 receives the frame image from the camera unit 101, and determines the type of the frame image, which is I-picture (Intra coded picture) generated with intra-frame coding, or P-picture (Predictive picture) generated with inter-frame coding, or B-picture (Bidirectionally picture). Firstly, the sort unit 102 outputs I-picture to the subtraction unit 104, and then, outputs P-picture and B-picture to the subtraction unit 104 and the motion detection unit 130. As FIG. 2 shows, each frame image processed by the sort unit 102 includes sixty-four macroblocks, which are generated by equally dividing a frame image 300 into 8 columns and 8 rows. Each macroblock consists of 16 pixels×16 lines of pixel data. The macroblocks are consecutively numbered from 1 to 64 in such a manner that eight macroblocks in the first row are numbered from 1 to 8 from left to right, and eight macroblocks in the second row are numbered from 9 to 16 from left to right, and so on. Each block number indicates a position of a macroblock in a frame image and the order of the encoding.

When outputting a macroblock of P-picture or I-picture having a block number "1", the sort unit 102 outputs a control signal indicating the beginning of a frame image to the motion detection unit 130.

The frame images are dealt with in units of macroblocks in the sort unit 102, the subtraction unit 104, the DCT unit 105, the quantization unit 106, the variable-length encoding unit 107, the predictive image generation unit 123, the addition unit 124, the inverse DCT unit 125, the inverse quantization unit 126, the motion detection unit 130, and the reference frame memory 131.

The subtraction unit 104 receives a macroblock of I-picture from the sort unit 102, and outputs the received macroblock to the DCT unit 105 without change. Also, the subtraction unit 104 receives a macroblock of P-picture or B-picture from the sort unit 102, receives a predictive image of a macroblock of P-picture or B-picture from the predictive image generation unit 123, and generates difference data by subtracting the predictive image from the macroblock received from the sort unit 102. The subtraction unit 104 outputs the generated difference data of the macroblock of P-picture or B-picture to the DCT unit 105.

The DCT unit 105 receives a macroblock of I-picture from the subtraction unit 104. Also, the DCT unit 105 receives difference data of the macroblock of P-picture or B-picture from the subtraction unit 104. The DCT unit 105 performs DCT (Discrete Cosine Transform) on the received macroblock of I-picture and on the difference data of the macroblock of P-picture or the difference data of the macroblock of B-picture, and thereby generates a DCT coefficient. Then, the DCT unit 105 outputs the generated DCT coefficient to the quantization unit 106.

The quantization unit 106 receives the DCT coefficient for the macroblock of I-picture, the DCT coefficient for the difference data of the macroblock of P-picture, and the DCT coefficient for the difference data of the macroblock of B-picture from the DCT unit 105. Then, the quantization unit 106 performs quantization on the received DCT coefficient to generate a quantized DCT coefficient, and outputs the generated quantized DCT coefficient for the macroblock of I-picture and the quantized DCT coefficient for the difference data of the macroblock of P-picture to the variable-length encoding unit 107 and the inverse quantization unit 126. Also, the quantization unit 106 outputs the quantized DCT coefficient for the difference data of the macroblock of B-picture to the variable-length encoding unit 107.

The variable-length encoding unit 107 receives the quantized DCT coefficient for the macroblock of I-picture or the quantized DCT coefficient for the difference data of the macroblock of P-picture or the quantized DCT coefficient for the difference data of the macroblock of B-picture from the quantization unit 106. Also, the variable-length encoding unit 107 receives a motion vector of P-picture or B-picture from the motion detection unit 130. Then, the variable-length encoding unit 107 generates variable-length codes according to the occurrence frequency of each piece of received data in such a manner that the variable-length encoding unit 107 allocates a short code to a piece of data occurring with high frequency, and allocates a long code to a piece of data occurring with low frequency. After that, the variable-length encoding unit 107 outputs the generated variable-length codes to the buffer memory 108.

The buffer memory 108 receives the variable-length codes from the variable-length encoding unit 107 and stores the codes. The variable-length codes stored in the buffer memory 108 are to be outputted to the main memory 110.

The rate control unit 109 monitors the amount of bits included in the variable-length codes received by the buffer memory 108, and optimizes the quantization scale of the quantization unit 106.

The main memory 110 receives the variable-length codes from the buffer memory 108, and stores the codes. The variable-length codes stored in the main memory 110 are to be outputted to an external storage device (a CD-R, a memory card, etc.).

The inverse quantization unit 126 receives the quantized DCT coefficient for the macroblock of I-picture, or the quantized DCT coefficient for the difference data of the macroblock of P-picture. Then, the inverse quantization unit 126 performs the inverse quantization on the received quantized DCT coefficient to generate DCT coefficient. After that, the inverse quantization unit 126 outputs the generated DCT coefficient for the macroblock of I-picture or the DCT coefficient for the difference data of the macroblock of P-picture to the inverse DCT unit 125.

The inverse DCT unit 125 receives the DCT coefficient for the macroblock of I-picture or the DCT coefficient for the difference data of the macroblock of P-picture from the inverse quantization unit 126, performs inverse DCT on the received DCT coefficient, and generates the macroblock of I-picture or the difference data of the macroblock of P-picture. After that, the inverse DCT unit 125 outputs the generated macroblock of I-picture or the difference data of the macroblock of P-picture to the addition unit 124.

The addition unit 124 receives the macroblock of I-picture or the difference data of the macroblock of P-picture from the inverse DCT unit 125, and receives the predictive image of the macroblock of P-picture from the predictive image generation unit 123. After that, the addition unit 124 outputs the received macroblock of I-picture to the reference frame memory 131 without change. Also, the addition unit 124 adds the received difference data of the macroblock of P-picture to the predictive image of the macroblock of P-picture, generates the macroblock of P-picture, and outputs the generated macroblock of P-picture to the reference frame memory 131.

The reference frame memory 131 receives the macroblocks of I-picture and P-picture from the addition unit 124, and stores the received macroblocks.

The motion detection unit 130 receives the macroblock of P-picture or B-picture from the sort unit 102, detects the motion vector of the received macroblock of P-picture or B-picture based on the macroblock of I-picture or B-picture stored in the reference frame memory 131, and outputs the detected motion vector to the variable-length encoding unit 107 and the predictive image generation unit 123. The motion detection unit 130 is described in detail later.

The predictive image generation unit 123 receives the motion vector of the macroblock of P-picture or B-picture from the motion detection unit 130, and generates the predictive image of the macroblock of P-picture or B-picture based on the received motion vector and the macroblock of I-picture or P-picture stored in the reference frame memory 131. After that, the predictive image generation unit 123 outputs the generated predictive image of the macroblock of P-picture to the subtraction unit 104 and the addition unit 124. Also, the predictive image generation unit 123 outputs the predictive image of the macroblock of B-picture to the subtraction unit 104.

1.2 Reference Frame Memory 131

The reference frame memory 131 consists of a RAM, and stores frame images of I-picture and P-picture, based on which the motion vector detection and the predictive image generation are performed during the motion-compensated predictive coding. I-picture and P-picture outputted from the addition unit 124 and stored in the reference frame memory 131 are called reference frames, and the macroblocks constituting each reference frame are called reference blocks.

1.3 Motion Detection Unit 130

Figure 3:
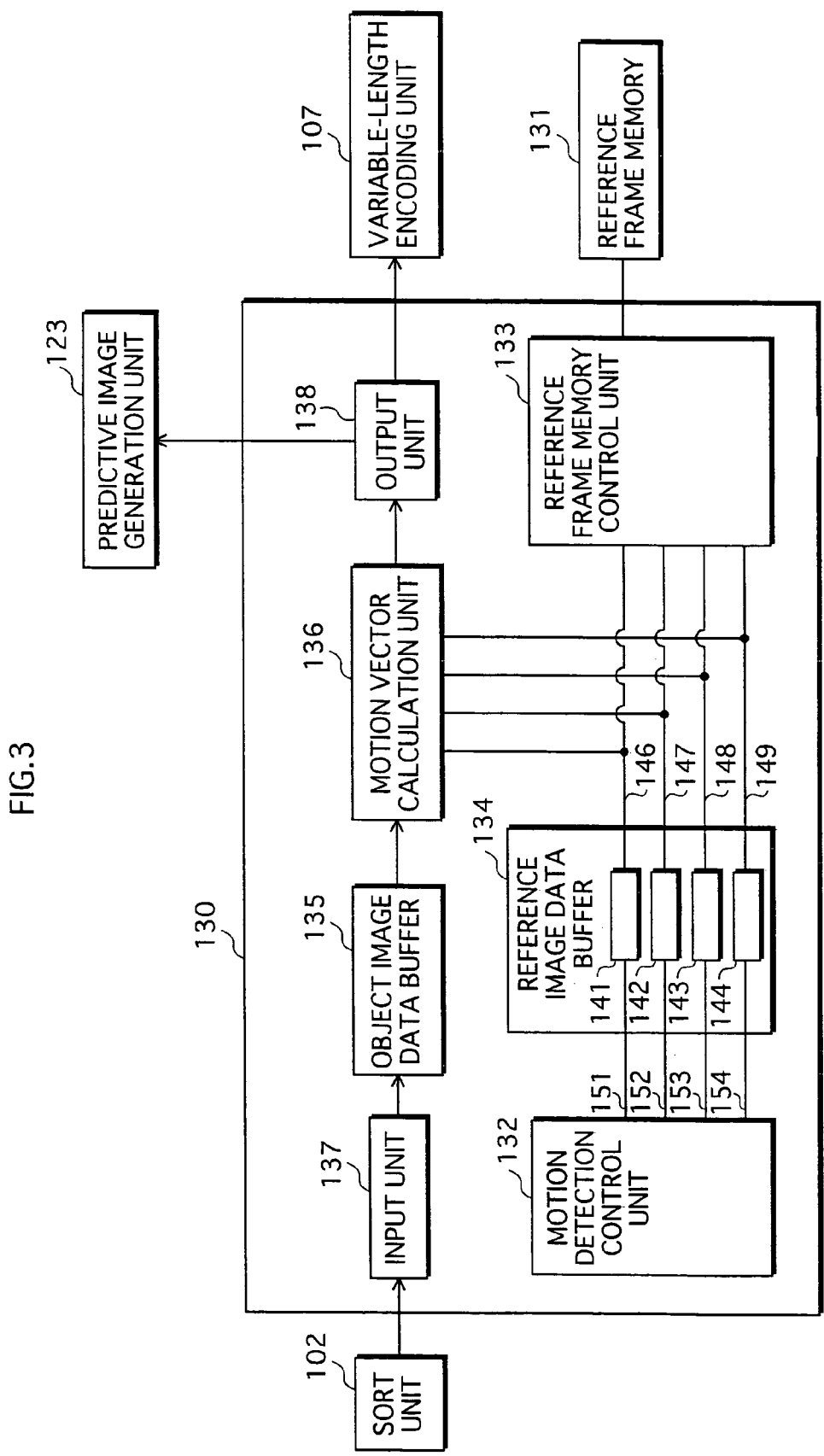
FIG. 3 is a block diagram showing a structure of a motion detection unit 130.

As FIG. 3 shows, the motion detection unit 130 includes a motion detection control unit 132, a reference frame memory control unit 133, a reference image data buffer 134, an object image data buffer 135, a motion vector calculation unit 136, an input unit 137, and an output unit 138.

(1) Input Unit 137

The input unit 137 receives the macroblock of P-picture or B-picture that is an object of the motion vector detection (this macroblock is hereinafter called the object block), and transfers the received object block to the object image data buffer 135. At the same time, the input unit 137 transmits a control signal indicating the reception of the object block to the motion detection control unit 132. In particular, when receiving the control signal indicating the beginning of a frame image from the sort unit 102 adding to the object block, the input unit 137 outputs the received control signal indicating the beginning of the frame image to the motion detection control unit 132.

(2) Reference Image Data Buffer 134 and Object Image Data Buffer 135

As FIG. 3 shows, the reference image data buffer 134 includes four memories 141 to 144, each having a capacity for storing 16 pixels×48 lines. These memories 141 to 144 are connected to the motion vector calculation unit 136 and the reference frame memory control unit 133 by individual busses 146 to 149 respectively. The memories 141 to 144 are also connected to the motion detection control unit 132 by individual busses 151 to 154 respectively.

Figure 4:
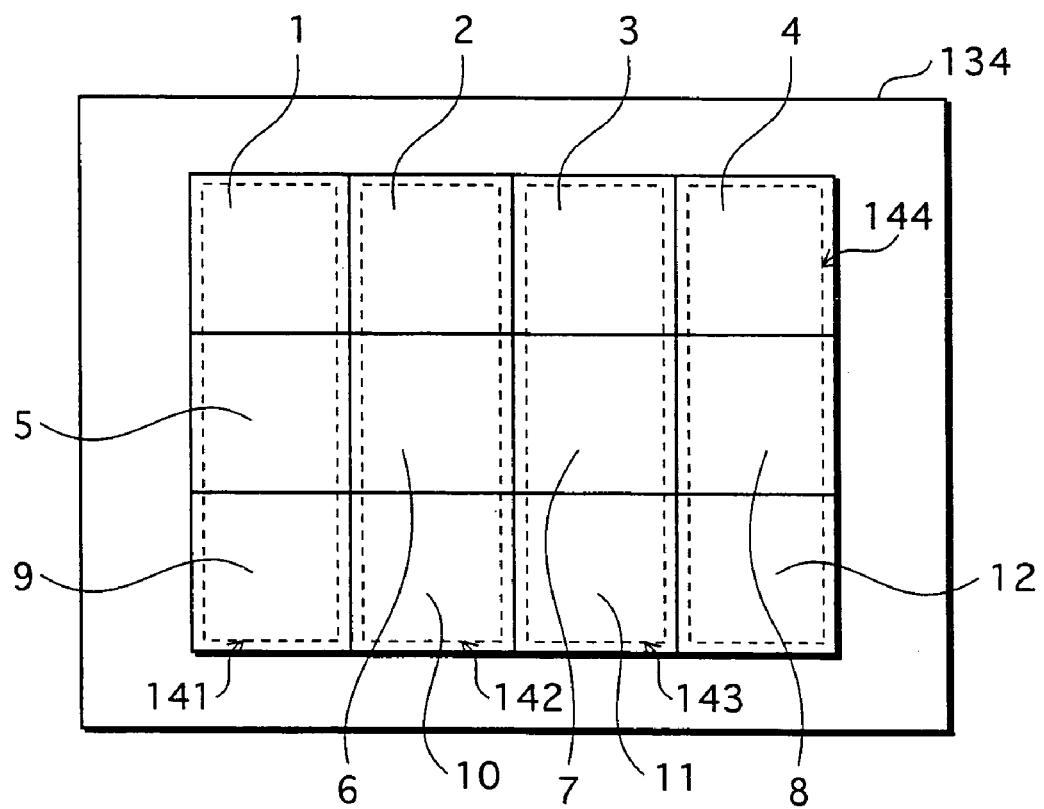
FIG. 4 shows a structure of a reference image data buffer 134 in the first embodiment.

Each memory has three block areas, and each block area has a capacity for storing one macroblock. FIG. 4 schematically shows such block areas in the reference image data buffer 134.

As FIG. 4 shows, the reference image data buffer 134 consists of twelve block areas 1 to 12, which are disposed in a shape of a matrix having 3 rows and 4 columns. The memory 141 consists of block areas 1, 5, and 9 included in the first column. The memory 142 consists of block areas 2, 6, and 10 included in the second column. The memory 143 consists of block areas 3, 7, and 11 included in the third column. The memory 144 consists of block areas 4, 8, and 12 included in the fourth column.

Physical addresses "1", "2", "3", and "4" are respectively allocated to the block areas 1 to 4 in the first row. Physical addresses "5", "6", "7", and "8" are respectively allocated to the block areas 5 to 8 in the second row. Physical addresses "9", "10", "11", and "12" are respectively allocated to the block areas 9 to 12 in the third row. Each physical address indicates the position of the corresponding block area.

Each block area consists of memory cells disposed in a shape of a matrix having 16 rows and 16 columns. A cell address is allocated to each memory cell. More specifically, cell addresses 0 to 15 are respectively allocated to sixteen memory cells in the first row of the block area having the physical address "1". Cell addresses 16 to 31 are respectively allocated to memory cells in the first row of the block area having the physical address "2". Cell addresses 32 to 47 are respectively allocated to memory cells in the first row of the block area having the physical address "3". Cell addresses 48 to 63 are respectively allocated to memory cells in the first row of the block area having the physical address "4". Also, cell addresses 64 to 79 are respectively allocated to sixteen memory cells in the second row of the block area having the physical address "1". Cell addresses 80 to 95 are respectively allocated to memory cells in the second row of the block area having the physical address "2". Cell addresses 96 to 111 are respectively allocated to memory cells in the second row of the block area having the physical address "3". Cell addresses 112 to 127 are respectively allocated to memory cells in the second row of the block area having the physical address "4". In this way, consecutive cell addresses are allocated to sixty-four memory cells in each row, and cell addresses 0 to 3071 are respectively allocated to the 3072 memory cells in the reference image data buffer 134.

The reference image data buffer 134 receives the reference block from the reference frame memory control unit 133, and stores the received reference block.

The object image data buffer 135 having a capacity for storing one macroblock receives the object block from the input unit 137 and stores the received object block.

(3) Motion Detection Control Unit 132

The motion detection control unit 132 controls the whole operation for detecting motion vectors as follows.

In the following description of the motion vector detection, a "reference area" means an area in a reference frame image including 3 rows×3 columns of reference blocks in such a manner that a reference block having the same number as the object block is included in the center of the reference blocks.

Control of Motion Vector Detection for One Frame

In the following description, an area including macroblocks constituting one row of a frame image is called a macroblock line. A reference block having a block number "n" is called reference block "n", and an object block having a block number "n" is called an object block "n".

The motion detection control unit 132 controls the motion vector detection for one frame image by the following operations (i) to (iii).

(i) Initialization

The motion detection control unit 132 receives the control signal indicating the beginning of a frame image from the sort unit 102 via the input unit 137. Then, the motion detection control unit 132 sets "1" to a block variable "n", and sets a PAT flag with use of the block variable "n=1".

The motion detection control unit 132 stores a block variable "n", which indicates a block number of an object block that is the object of the motion vector detection. When receiving a control signal indicating the reception of the object block from the input unit 137, the motion detection control unit 132 adds "1" to the block variable "n".

The PAT flag is described later.

(ii) Repetitive Operations for Each Macroblock Line

The following operations (A) to (C) are performed repeatedly on each macroblock line in the object frame.

(A) The motion detection control unit 132 writes a reference block into the reference image data buffer 134. This reference block is required for detecting the motion vector of the object block at the beginning of the macroblock line.

(B) The motion detection control unit 132 performs the following operations (a) and (b) repeatedly on the $1^{st}$ to $7^{th}$ object blocks constituting a macroblock line.

(a) The motion detection control unit 132 performs the following operations (a-1) and (a-2) on each object block in parallel.

(a-1) Detection of the motion vector of each object block (a-2) Writing of the reference block corresponding to the succeeding object block (b) The motion detection control unit 132 receives a control signal indicating the reception of an object block from the input unit 137. This object block becomes the next object of the motion vector detection. Then, the motion detection control unit 132 adds "1" to the block variable "n", and sets the PAT flag with use of the block variable that is the result of the addition.

(C) The motion detection control unit 132 performs the motion vector detection of the $8^{th}$ object block in the macroblock line. Next, the motion detection control unit 132 receives a control signal indicating the reception of the object block from the input unit 137. This object block becomes the next object of the motion vector detection. Then, the motion detection control unit 132 adds "1" to the block variable "n", and sets the PAT flag with use of the block variable that is the result of the addition.

(iii) The motion detection control unit 132 detects the motion vector of object block "64", and finishes the motion vector detection for one frame.

The following is a detailed description of the operations (i) to (iii) described above.

(i) Initialization

The motion detection control unit 132 receives the control signal, which indicates the beginning of a frame image, from the input unit 137, and sets "1" to the block variable "n".

Then, the motion detection control unit 132 sets four bits of PAT flag. The following is a detailed description of the PAT flag.

Figure 5:
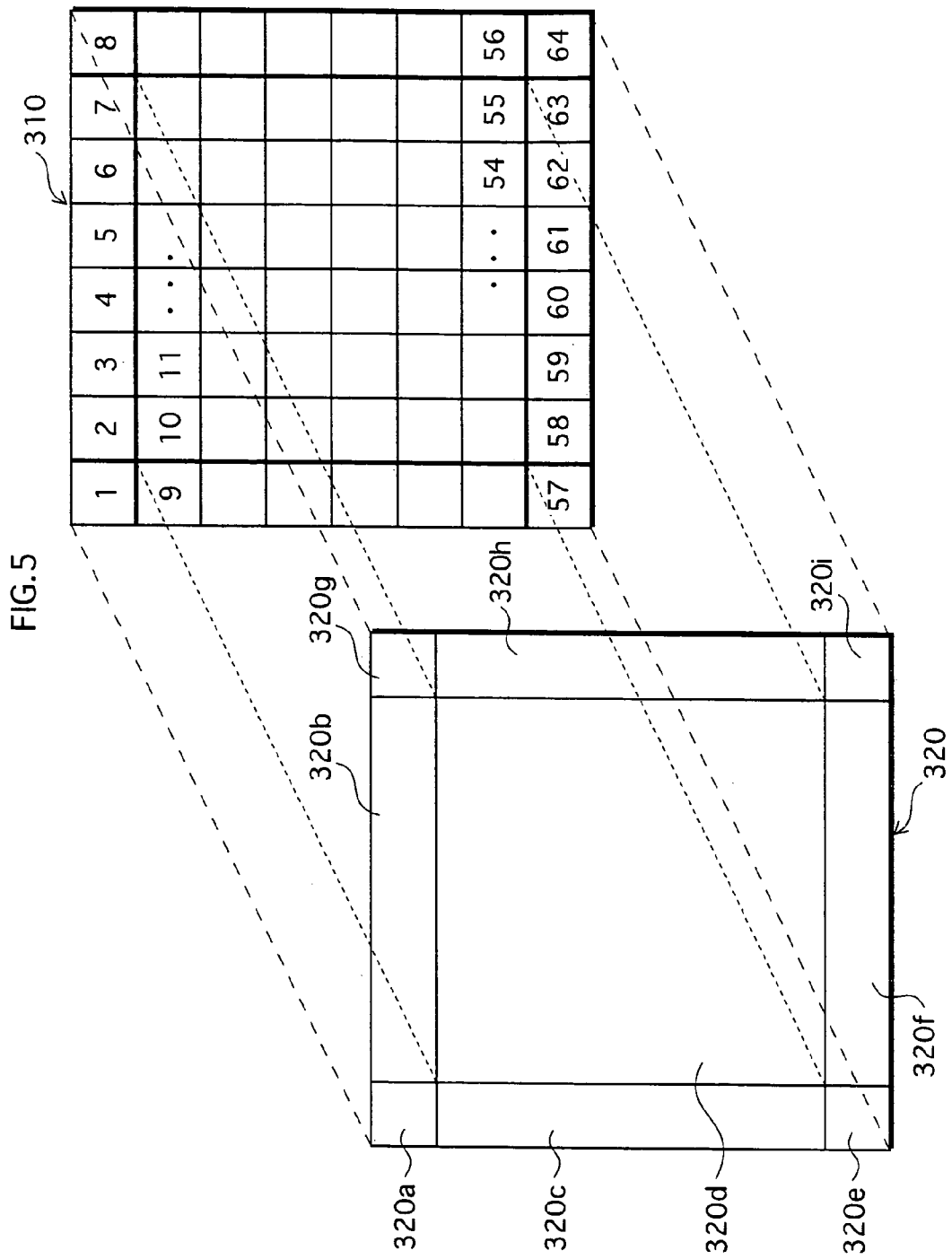
FIG. 5 shows a classification of each object block based on its position on an object frame.

As FIG. 5 shows, an object frame 310 is divided into sixty-four macroblocks. Each macroblock is classified into one of 9 areas 320*a* to 320*i* as shown in an object frame 320. Each macroblock is classified according to whether or not the macroblock adjoins the left, right, top or bottom edge of the frame. The area 320*a* includes the object block "1" adjoining both the top edge and the left edge. The area 320*b* includes the object blocks "2" to "7", each adjoining the top edge. The area 320*c* includes the object blocks "9", "17" . . . "49", each adjoining the left edge. The area 320*d* includes the object blocks "10" to "15", "18" to "23" . . . "50" to "55", each not adjoining any edges. The area 320*e* includes the object block "57" adjoining the bottom and the left edges. The area 320*f* includes the object blocks "58" to "63", each adjoining the bottom edge. The area 320*g* includes the object block "8" adjoining the top and right edges. The area 320*h* includes the object blocks "16", "24" . . . "56", each adjoining the right edge. The area 320*i* includes the object block "64" adjoining the right and bottom edges.

The PAT flag consists of a first bit, a second bit, a third bit, and a fourth bit. When an object block adjoins the top edge of the object frame, "1" is set to the first bit. When an object block does not adjoin the top edge of the object frame, "0" is set to the first bit. When an object block adjoins the bottom edge of the object frame, "1" is set to the second bit. When an object block does not adjoin the bottom edge of the object frame, "0" is set to the second bit. When an object block adjoins the left edge of the object frame, "1" is set to the third bit. When an object block does not adjoin the left edge of the object frame, "0" is set to the third bit. When an object block adjoins the right edge of the object frame, "1" is set to the fourth bit. When an object block does not adjoin the right edge of the object frame, "0" is set to the fourth bit.

The object block "1" included in the area 320*a* of the object frame 320 adjoins both top and left edges. Therefore, the first bit and the third bit become "1", and the second bit and the fourth bit become "0υ. Accordingly, the PAT flag becomes "1010". The object blocks "2" to "7" included in the area 320*b* adjoin the top edge. Therefore, the first bit becomes "1", and the second bit, the third bit, and the fourth bit become "0". Accordingly, the PAT flag becomes "1000". The object blocks "9", "17" . . . "49"included in the area 320*c* adjoin the left edge. Therefore, the third bit becomes "1", and the first bit, the second bit, and the fourth bit become "0". Accordingly, the PAT flag becomes "0010". The object blocks "10" to "15", "18" to "23" . . . "50" to "55" included in the area 320*d* do not adjoin any edges. Therefore, all the bits become "0". Accordingly, the PAT flag becomes "0000". The object block "57" included in the area 320*e* adjoins both bottom and left edges. Therefore, the second bit and the third bit become "1" and the first bit and the fourth bit become "0" . Accordingly, the PAT flag becomes "0110" .The object blocks "58" to "63" included in the area 320*f* adjoin the bottom edge. Therefore, the second bit becomes "1", and the first bit, the third bit, and the fourth bit become "0". Accordingly, the PAT flag becomes "0100". The object block "8" included in the area 320*g* adjoins both top and right edges. Therefore, the first bit and the fourth bit become "1", and the second bit and the third bit become "0" . Accordingly, the PAT flag becomes "1001". The object blocks "16", "24" . . . "56" included in the area 320*h* adjoin the right edge. Therefore, the fourth bit becomes "1", and the first bit, the second bit, and the third bit become "0". Accordingly, the PAT flag becomes "0001". The object block "64" included in the area 320*i* adjoins both bottom and right edges. Therefore, the second bit and the fourth bit become "1", and the first bit and the third bit become "0". Accordingly, the PAT flag becomes "0101".

The motion detection control unit 132 sets "0" or "1" to Each bit of the PAT flag with use of the block variable "n" in the following manner.

The motion detection control unit 132 judges whether $n \leq 8$ is satisfied or not, and when that is satisfied, sets "1" to the first bit, and when that is not satisfied, sets "0" to the first bit. The motion detection control unit 132 judges whether $n \geq 57$ is satisfied or not, and when that is satisfied, sets "1" to the second bit, and when it is not satisfied, sets "0" to the second bit. Next, the motion detection control unit 132 calculates the remainder of n/8. When the remainder is "1", the motion detection control unit 132 sets "1" to the third bit, and when the remainder is not "1", sets "0" to the third bit. The motion detection control unit 132 judges whether the remainder of n/8 is "0" or not. When n/8 is "0", the motion detection control unit 132 sets "1" to the fourth bit. When the remainder of n/8 is not "0", the motion detection control unit 132 sets "0" to the fourth bit.

Every time the block variable "n" is changed, the motion vector control unit 132 calculates the PAT flag corresponding to the changed block variable "n" in the manner described above.

In the following motion vector detection, the motion detection control unit 132 performs the control according to the PAT flag.

(ii) Repetitive Operations for Each Macroblock Line

The following operations (A) to (C) are performed repeatedly for each macroblock line in the object frame.

(A) The motion detection control unit 132 outputs the block variable "n" of the top object block of a macroblock line and the set PAT flag to the reference frame memory control unit 133. Then, the motion detection control unit 132 instructs the reference frame memory control unit 133 to read the reference block required for detecting motion vector of the object block "n" and output the read reference block to the reference image data buffer 134.

Next, the motion detection control unit 132 stores the reference block, which is outputted by the reference frame memory control unit 133, in a block area in the reference image data buffer 134. This block area is predetermined as a writing destination. The reference block outputted by the reference frame memory control unit 133 is described in detail in the description of the reference frame memory control unit 133 later.

Also, the motion detection control unit 132 sets the physical address of a top right block area among block areas, which are set as destinations to write the reference block corresponding to the top object block of the macroblock line, to a parameter "t". The parameter "t" is used for calculating the physical address of the destination block area in the reference image data buffer 134. Into the destination block area, the reference block corresponding to the succeeding object block is to be written. The parameter "t" is described in detail in (a-2) below.

More specifically, the motion detection control unit 132 stores four reference blocks in block areas which having physical addresses "6", "7", "10, and "11" respectively and included in the reference image data buffer 134. These four reference blocks correspond to the object block (the PAT flag is 1010) included in the area 320*a*. Then, the motion detection control unit 132 sets "7" to the parameter "t".

The motion detection control unit 132 stores six reference blocks in block areas having physical addresses "2", "3", "6", "17", "10", and "11" respectively and included in the reference image data buffer 134. These six reference blocks correspond to the object block (the PAT flag is 0010) included in the area 320*c*. Then, the motion detection control unit 132 sets "3" to the parameter "t".

The motion detection control unit 132 stores four reference blocks in block areas having physical addresses "2", "3", "6", and "7" respectively and included in the reference image data buffer 134. These four reference blocks correspond to the object block (the PAT flag is 0110) included in the area 320*e*. Then, the motion detection control unit 132 sets "3" to the parameter "t".

After that, the motion detection control unit 132 sets an initial value "k=0" to a parameter "k", which is used for reading the reference block at a time of motion vector detection. The parameter "k" is described in detail in an operation (a-1) below.

(B) Next, the motion detection control unit 132 repeats the following operations (a) and (b) according to the PAT flag of block number "n" when the PAT flag is any of "1010", "1000", "0010", "0000", and "0100" ($1^{st}$ to $7^{th}$ object blocks in the macroblock line). When the PAT flag is "1001" or "0001" (the last object blocks in the macroblock line), the motion detection control unit 132 performs an operation (C). When the PAT flag is "0101" (the object block "64"), the motion detection control unit 132 performs an operation (iii).

(a) The motion detection control unit 132 performs the following processing (a-1) and (a-2) in parallel for each object block.

Note that the motion detection control unit 132 can control the memories 141 to 144 individually, because the motion detection control unit 132 and the memories 141 to 144 in the reference image data buffer 134 are connected by individual busses 151 to 154. Therefore, the motion detection control unit 132 can read from the memory including a block area specified as a detection area, and can write into the memory including a block area outside of the detection area at the same time. This means that the motion detection control unit 132 can perform the operations (a-1) and (a-2) in parallel.

(a-1) Motion Vector Detection for Each Object Block

The motion detection control unit 132 controls the motion vector detection for each object block by the following operations ① to ④.

① Firstly, the motion detection control unit 132 specifies a block area storing a reference block required for detecting the motion vector of the object block "n" as a detection area. This block area is included in the reference image data buffer 134. The following is a detailed description.

Figure 6:
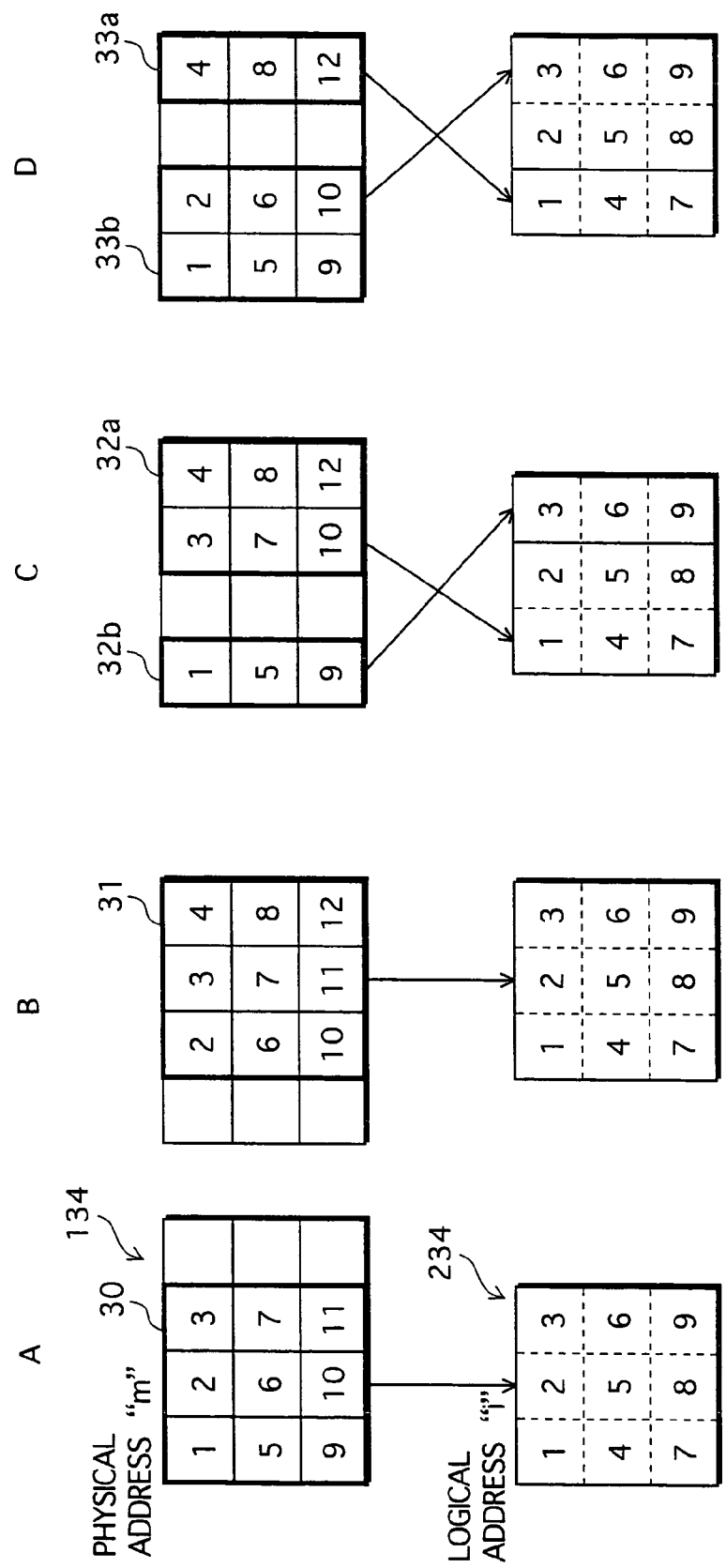
FIG. 6 shows a relationship between physical addresses of a reference image data buffer 134 and logical address space 234 used by a motion vector calculation unit.

As FIG. 6 shows, in the motion vector detection, a logical address space 234, which is used by the motion vector calculation unit 136, consists of logical block areas disposed in a shape of matrix having 3 rows and 3 columns. Logical addresses "1", "2", and "3" are respectively allocated to the three logical block areas in the first row from left to right. Logical addresses "4", "5", and "6" are respectively allocated to the three logical block areas in the second row from left to right. Logical addresses "7", "8", and "9" are allocated to the three logical block areas in the third row respectively from left to right.

The logical addresses are not the same as the physical addresses. The motion detection control unit 132 calculates a physical address "m" (m=1 to 12) corresponding to the logical addresses "i" (i=1 to 9) by a formula "m=i+I+k". The area consisting of nine block areas, each having the calculated physical addresses "m", is the detection area of the object block "n". The block areas in the detection area correspond to the logical block areas in the logical address space in such a manner that a reference block having the same block number as the object block is placed in the center of the logical address space. The parameter "I" is determined by the logical address "i". When i=1 to 3, I=0. When i=4 to 6, I=1. When i=7 to 9, I =2. Note that when i=1 to 3 and m>4, m=m−4. Also, when i=4 to 6 and m>8, m=m−4. When i=7 to 9 and m>12, m=m−4.

The parameter "k" is a variable within a range from 0 to 3. Every time the vector detection of an object block is performed, a value "1" is added to the parameter "k", and the detection area in the reference image data buffer 134 moves to the next column.

The transition of the detection area according to the change of the parameter "k" is described next with reference to FIG. 6.

When k=0, the relation between the logical address "i" and the physical address "m" is "m=i+I". In this case, the area 30 including the block areas respectively having physical addresses "1", "2", "3", "5", "6", "7", "9", "10", and "11" becomes the detection area as FIG. 6A shows. When k=1, the relation between the logical address "i" and the physical address "m" is "m=i+I+1". In this case, the area 31 including the block areas respectively having physical addresses "2", "3", "4", "6", "7", "8", "10", "11", and "12" becomes the detection area as FIG. 6B shows. When k=2, the relation between the logical address "i" and the physical address "m" is "m=i+I+2" In this case, the area 32*a* including the block areas respectively having physical addresses "3", "4", "7", "8", "11", and "12", and the area 32*b* including the block areas respectively having physical addresses "1", "5", and "9" become the detection area as FIG. 6C shows. When k=3, the relation between the logical address "i" and the physical address "m" is "m=i+I+3". In this case, the area 33*a* including the block areas respectively having physical addresses "4", "8", and "12", and the area 33*b* including the block areas respectively having physical addresses "1", "2", "5", "6", "9", and "10" become the detection area as FIG. 6D shows.

② The logical address space consists of 3×3 of logical block areas, in which the logical block corresponding to the block area storing the reference block having the same block number as the object block "n" is placed in the center. The logical block areas corresponding to the block areas storing the reference block required for detecting the motion vectors of the object blocks included in the area 320*a* are only logical block areas respectively having logical addresses "5", "6", "8", and "9". Also, the logical block areas corresponding to the block areas storing the reference block required for detecting the motion vectors of the object blocks included in the area 320*b* are only logical block areas respectively having logical addresses "4", "5", "6", "7", "8", and "9". The logical block areas corresponding to the block areas storing the reference block required for detecting the motion vectors of the object blocks included in the area 320*c* are only logical block areas respectively having logical addresses "2", "3", "5", "6", "8", and "9". The logical block areas corresponding to the block areas storing the reference block required for detecting the motion vectors of the object blocks included in the area 320e are only logical block areas respectively having logical addresses "2", "3", "5", and "6". The logical block areas corresponding to the block areas storing the reference block required for detecting the motion vectors of the object blocks included in the area 320f are only logical block areas respectively having logical addresses "1", "2", "3", "4", "5", and "6". The logical block areas corresponding to the block areas storing the reference block required for detecting the motion vectors of the object blocks included in the area 320g are only logical block areas respectively having logical addresses "4", "5", "7", and "8". The logical block areas corresponding to the block areas storing the reference block required for detecting the motion vectors of the object blocks included in the area 320h are only logical block areas respectively having logical addresses "1", "2", "4", "5", "7", and "8". The logical block areas corresponding to the block areas storing the reference block required for detecting the motion vectors of the object blocks included in the area 320i are only logical block areas respectively having logical addresses "1", "2", "4", and "5". Therefore, the motion detection control unit 132 specifies a calculation range in the detection area in order not to use logical block areas other than the above-described logical areas for the motion vector detection. More specifically, the motion detection control unit 132 specifies a calculation range described next by specifying the range of the displacement (x, y) of the object block with use of a block-matching method. The block-matching method is described in detail later.

When the object block is in the area 320a (the PAT flag is "1010"), the motion detection control unit 132 specifies the calculation range by $0 \leq x \leq 16$ and $0 \leq y \leq 16$. When the object block is in the area 320b (the PAT flag is "1000"), the motion detection control unit 132 specifies the calculation range by $-16 \leq x \leq 16$ and $0 \leq y \leq 16$. When the object block is in the area 320c (the PAT flag is "0010"), the motion detection control unit 132 specifies the calculation range by $0 \leq x \leq 16$ and $-16 \leq y \leq 16$. When the object block is in the area 320d (the PAT flag is "0000"), the motion detection control unit 132 specifies the calculation range by $-16 \leq x \leq 16$ and $-16 \leq y \leq 16$. When the object block is in the area 320e (the PAT flag is "0110"), the motion detection control unit 132 specifies the calculation range by $0 \leq x \leq 16$ and $-16 \leq y \leq 0$. When the object block is in the area 320f (the PAT flag is "0100"), the motion detection control unit 132 specifies the calculation range by $-16 \leq x \leq 16$ and $-16 \leq y \leq 0$. When the object block is in the area 320g (the PAT flag is "1001"), the motion detection control unit 132 specifies the calculation range by $-16 \leq x \leq 0$ and $0 \leq y \leq 16$. When the object block is in the area 320h (the PAT flag is "0001"), the motion detection control unit 132 specifies the calculation range by $-16 \leq x \leq 0$ and $-16 \leq y \leq 16$. When the object block is in the area 320i (the PAT flag is "0101"), the motion detection control unit 132 specifies the calculation range by $-16 \leq x \leq 0$ and $-16 \leq y \leq 0$.

③ Next, the motion detection control unit 132 outputs the calculation range specified as described above and instructions for performing the motion vector detection to the motion vector calculation unit 136.

Then, the motion detection control unit 132 repeats the following operations ③$_{-1}$ to ③$_{-4}$ until receiving a control signal from the motion vector calculation unit 136 indicating that the motion vector detection has finished. When receiving the control signal indicating that the motion vector detection has finished, the motion detection control unit 132 instructs the output unit 138 to output the detected motion vector to the predictive image generation unit 123 and the variable-length encoding unit 107.

③$_{-1}$ Firstly, the motion detection control unit 132 receives a pixel position (p, j) on the object block and coordinates (x', y') on the logical address space from the motion vector calculation unit 136. (The pixel position (p, j) and coordinates (x', y') are described in detail later.)

③$_{-2}$ The motion detection control unit 132 reads image data corresponding to the received pixel position (p, j) from the object image data buffer 135, and outputs the read image data to the motion vector calculation unit 136.

③$_{-3}$ The motion detection control unit 132 converts the received coordinates (x', y') on the logical address space into a cell address by the following calculations.

Firstly, the motion detection control unit 132 judges the value of the parameter "k". When k=0, the motion detection control unit 132 calculates "X=x'+16" and "Y=y'+16". When k=1, the motion detection control unit 132 calculates "X=x'+32" and "Y=y'+16". When k=2, the motion detection control unit 132 calculates "X=x'+48" (x'≤15), "X=x'−16" (x'≥16), and "Y=y'+16". When k=3, the motion detection control unit 132 calculates "X=x'+64" (x'≤−1), "X=x' (x'≥0)", and "Y=y'+16".

Here, X corresponds to each column of 48 rows×64 columns of memory cells constituting the reference image data buffer 134 on one-to-one basis, and indicates the column including the memory cell whose cell address is to be calculated. Y corresponds to each row of 48 rows×64 columns of memory cells constituting the reference image data buffer 134 on one-to-one basis, and indicates the row including the memory cell, whose cell address is to be calculated. ($0 \leq X \leq 63$, $0 \leq Y \leq 47$).

Then, the motion detection control unit 132 calculates the cell address "X+64Y".

③$_{-4}$ The motion detection control unit 132 reads the pixel data stored in the memory cell having the calculated cell address, and outputs the read pixel data to the motion vector calculation unit 136.

④ The motion detection control unit 132 adds "1" to the parameter "k" and judges whether or not the parameter "k" satisfies k=4. When k=4, the motion detection control unit 132 sets "0" to "k". When k≠4, the motion detection control unit 132 performs the next operation.

(a-2) Writing of Reference Block Corresponding to Object Block "n+1"

By the following operations, the reference block required for detecting the motion vector of the object block "n+1", which is the next object of the motion vector detection, is written into the reference image data buffer 134.

Firstly, the motion detection control unit 132 calculates "n'=n+1", which is obtained by adding "1" to the block variable "n". Then, the motion detection control unit 132 sets the PAT flag of the block variable "n'" with use of the method described in (i) above.

The motion detection control unit 132 outputs the value of the block variable "n" and the set PAT flag of the block variable "n'" to the reference frame memory control unit 133, and controls the reading of the reference block and the output of the read reference block to the reference image data buffer 134.

Then, the motion detection control unit 132 selects the destination in the reference image data buffer 134 to write the reference block with use of the parameter "t" according to the PAT flag of the block variable "n'".

The range of the parameter "t" is from 4 to 7 when the object block is in the area 320a or the area 320b, and is from 0 to 3 when the object block is in the areas 320c to 320f. Every time a reference block corresponding to an object block is written into the reference image data buffer 134, a value "1" is added to the parameter "t", and a writing destination area in the reference image data buffer 134, into which the reference block is to be written, moves to the next column.

When the PAT flag of the block variable "n'" is "1000", the motion detection control unit 132 judges whether or not the parameter "t" satisfies t=8. When t=8, the motion detection control unit 132 sets "4" to "t". When t≠8, the motion detection control unit 132 performs the next operation. Then, the motion detection control unit 132 specifies the block areas respectively having physical addresses "t+1" and "t+5" as the writing destination area, and adds "1" to the parameter "t".

When the PAT flag of the block variable "n'" is "0000" or "0100", the motion detection control unit 132 judges whether or not the parameter "t" satisfies t=4. When t=4, the motion detection control unit 132 sets "0" to "t". When t≠4, the motion detection control unit 132 performs the next operation. Then, the motion detection control unit 132 specifies the block areas respectively having physical addresses "t+1", "t+5" and "t+9" as the writing destination area, and adds "1" to the parameter "t".

After this addition, the motion detection control unit 132 writes the reference block outputted by the reference frame memory control unit 133 into the block area specified as the writing destination.

(b) Next, the motion detection control unit 132 receives the control signal indicating the reception of the object block from the input unit 137, and adds "1" to the block variable. Then, the motion detection control unit 132 sets the PAT flag with use of the block variable that is the result of the addition.

(C) The motion detection control unit 132 performs the detection of the motion vector of the 8$^{th}$ object block in the macroblock line by the operations described in (a-1). Then, the motion detection control unit 132 sets the PAT flag with use of the block variable that is the result of the addition.

(iii) The motion detection control unit 132 detects the motion vector of the object block "64" by the operations described in (a-1), and finishes the motion vector detection for one frame.

(4) The Reference Frame Memory Control Unit 133

The reference frame memory control unit 133 receives the block variable "n" and the PAT flag derived from the block variable "n" from the motion detection control unit 132. Then, he reference frame memory control unit 133 receives an instruction for reading and outputting the reference block.

The reference frame memory control unit 133 performs the following calculations according to the received PAT flag, and selects a reference block that is to be transferred from the reference frame memory 131 to the reference image data buffer 134 next time. This selection is performed so that there is no duplication of the reference block stored in the reference image data buffer 134.

When the object block is in the area 320a (the PAT flag is "1010"), the reference frame memory control unit 133 selects reference blocks having the block numbers of "n", "n+1", "n+8", and "n+9" respectively.

When the object block is in the area 320b (the PAT flag is "1000"), the reference frame memory control unit 133 selects reference blocks having the block numbers of "n+1" and "n+9" respectively.

When the object block is in the area 320c (the PAT flag is "0010"), the reference frame memory control unit 133 selects reference blocks having the block numbers of "n−8", "n−7", n, "n+1", "n+8", and "n+9" respectively.

When the object block is in the area 320d (the PAT flag is "0000"), the reference frame memory control unit 133 selects reference blocks having the block numbers of "n−7", "n+1", and "n+9" respectively.

When the object block is in the area 320e (the PAT flag is "0110"), the reference frame memory control unit 133 selects reference blocks having the block numbers of "n−8", "n−7", "n" and "n+1" respectively.

When the object block is in the area 320f (the PAT flag is "0100"), the reference frame memory control unit 133 selects reference blocks having the block numbers of "n−7", and "n+1" respectively.

When the object block is in any of the areas 320g to 320i (the PAT flag is "1001" or "0001" or "0101"), the reference frame memory control unit 133 does not select any reference blocks and performs the next operation.

Then, the reference frame memory control unit 133 reads the selected reference block from the reference frame memory 131, and outputs the read reference block to the reference image data buffer 134.

(5) Motion Vector Calculation Unit 136

For calculating the motion vector, a coordinate system is defined. In this coordinate system, the position of the top left pixel of a logical block area in the logical address space, which has the logical address "5", is defined as the origin (0, 0). The value indicated by the x'-axis increases row-wise from left to right, and the value indicated by the y'-axis increases column-wise from top to bottom. With this coordinate system, each pixel can be represented by coordinates. Each pixel on the logical address space is within a range represented by $-16 \leq x' \leq 31$ and $-16 \leq y' \leq 31$.

When the position of the object block is translated in the logical address space defined above, the displacement of this translation is represented by (x, y). When the object block is the same as the logical block area having the logical address "5", the displacement is represented by (0, 0). The object block is displaced in a range represented by $-16 \leq x \leq 16$ and $-16 \leq y \leq 16$.

Also, a coordinate value "p" and a coordinate value "j" are defined on the 16 rows×16 columns of pixels in the object block. The coordinate value "p" increases from 0 to 15 from left to right, and the coordinate value "j" increases from 0 to 15 from top to bottom. Each pixel is represented by (p, j). Pixel data at a pixel position (p, j) is represented by "original (p, j)".

When the displacement of the object block is (x, y) on the logical address space, the coordinates of the pixel on the logical address space corresponding to the pixel position (p, j) on the object block are represented by (p+x, j+y). Pixel data on the reference block corresponding to the coordinates (p+x, j+y) on the logical address space is represented by "previous (p+x, j+y)".

The motion vector calculation unit 136 receives the calculation range and the instruction for detecting the motion vector from the motion detection control unit 132. The motion vector calculation unit 136 detects the motion vector by performing operations (i) and (ii). The following is the description of the operations (i) and (ii).

(i) Motion Vector Detection

Motion vectors of all the displacements (x, y) in the detection area specified by the motion detection control unit 132 are detected by the following operations (a) and (b).

(a) Calculation of Value of Error S(x, y)

The value of error S(x, y) of the displacement (x, y) is calculated by performing the following operations (a-1) to (a-3) on each "p" and "j" ($0 \leq p \leq 15$, $0 \leq j \leq 15$). With use of FORMULA 1 below as an example of the value of error, a value of mean absolute error is calculated as follows.

(a-1) The motion vector calculation unit 136 outputs the pixel position (p, j) on the object block and the coordinates (p+x, j+y) on the logical address space corresponding to the pixel position (p, j) to the motion detection control unit 132. (For simplification, x' and y' are assumed to satisfy x'=p+x and y'=j+y.)

(a-2) Next, the motion vector calculation unit 136 receives pixel data "original (p, j)" on the object block "n" corresponding to the pixel position (p, j), and pixel data "previous (x', y')" on the reference block corresponding to the coordinates (x', y') from the motion detection control unit 132.

(a-3) The received pixel data is assigned to the next FORMULA 1.

$$S(x, y) = \sum_{j=0}^{15} \sum_{p=0}^{15} |\text{original}(p, j) - \text{previous}(p + x, j + y)| \quad \text{FORMULA 1}$$

(b) The motion vector calculation unit 136 compares the values of error S(x, y) calculated for each displacement (x, y), and determines the minimum displacement (x, y).

(ii) Output of Motion Vector

The motion vector calculation unit 136 outputs the minimum displacement (x, y) determined in the operation (i) to the output unit 138 as the motion vector of the object block "n", and outputs the control signal indicating that the detection has finished to the motion detection control unit 132.

The method for calculating motion vectors in the above-described manner is generally called "block-matching method".

(6) Output Unit 138

The output unit 138 receives the motion vector calculated by the motion vector calculation unit 136, and outputs the received motion vector to the predictive image generation unit 123 and the variable-length encoding unit 107 according to the instruction from the motion detection control unit 132.

1.4 Operations of Motion Detection Unit 130

(1) Operations for Detecting Motion Vectors of One Frame

Figure 7:
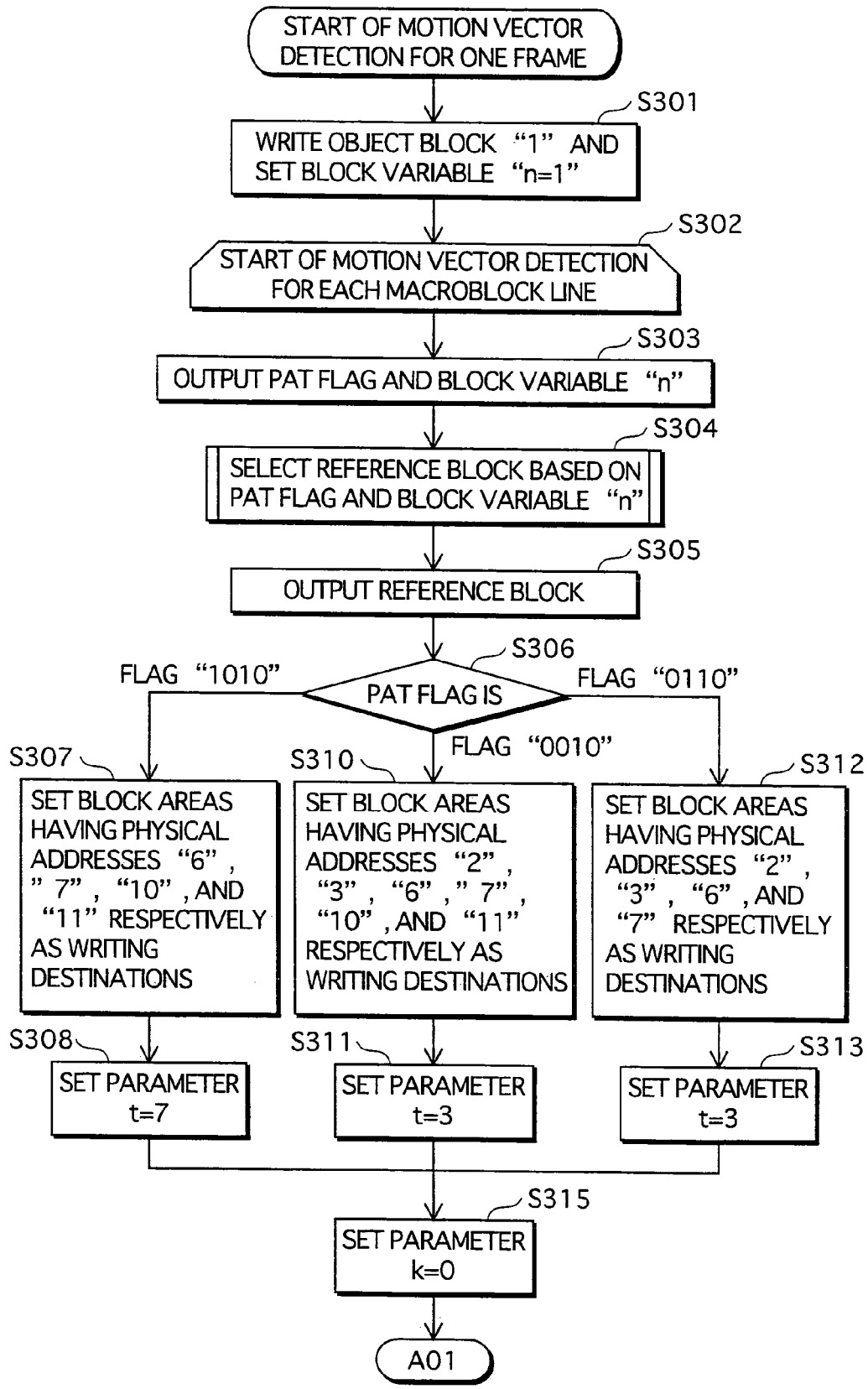
FIG. 7 is a flowchart showing operations for detecting motion vectors of object blocks constituting one frame performed by a motion detection unit 130 (Continued on FIG. 8)
Figure 8:
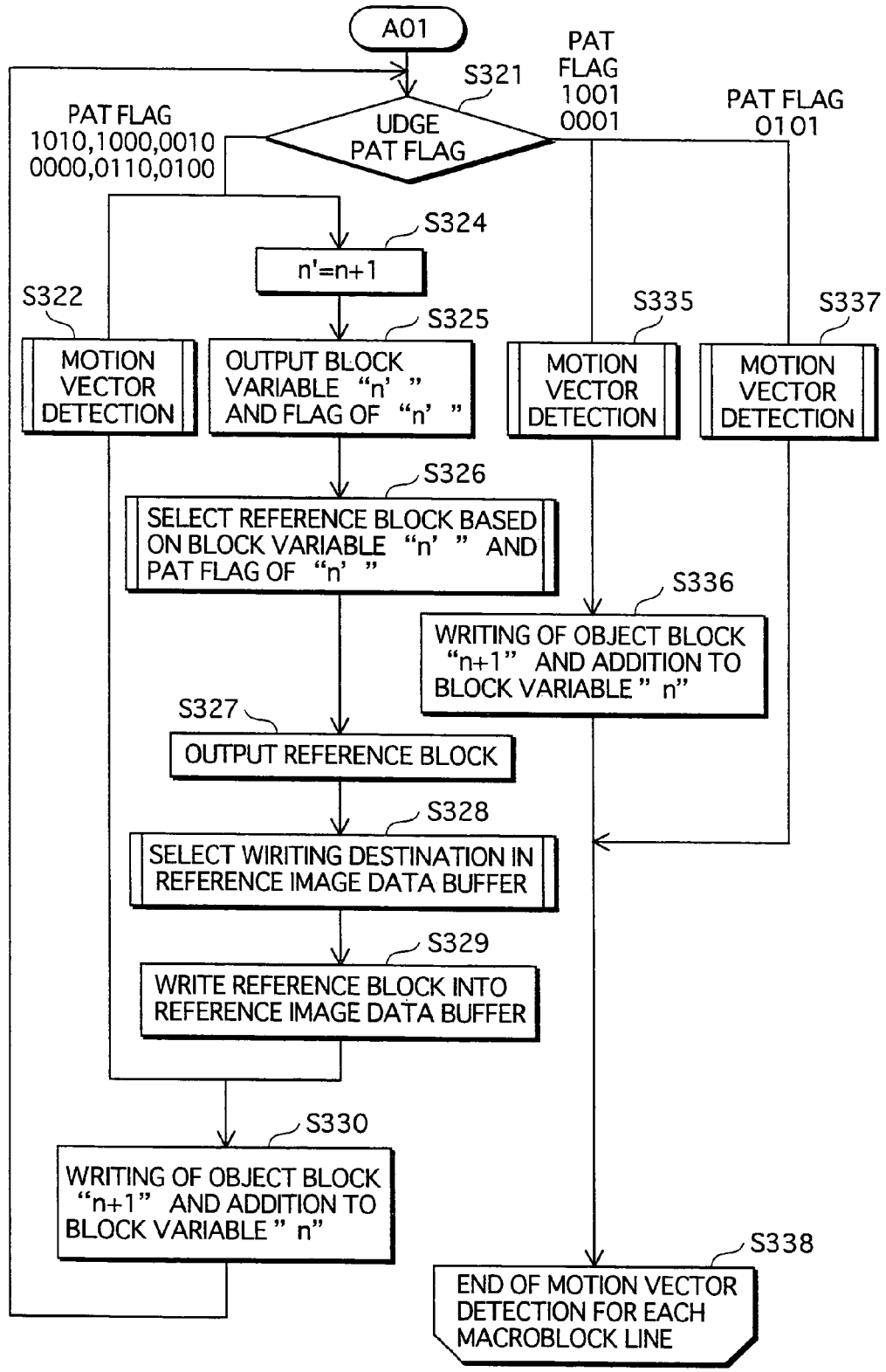
FIG. 8 is a flowchart showing operations for detecting motion vectors of object blocks constituting one frame performed by a motion detection unit 130 (Continued from FIG. 7)

Operations for detecting motion vectors of one frame are described next with reference to flowcharts shown in FIG. 7 and FIG. 8.

The input unit 137 receives the object block "1" and the control signal indicating the beginning of a frame image from the sort unit 102, writes the received object block "1" into the object image data buffer 135, and transfers the control signal indicating the beginning of the frame image to the motion detection control unit 132. The motion detection control unit 132 sets "n=1" to the block variable "n", and sets the PAT flag "1010" derived from the block variable (Step S301).

In Steps S302 to S338, the processing of Steps S303 to S337 is performed repeatedly for each macroblock line until the vector detection for all the macroblock lines in the object frame finishes.

The motion detection control unit 132 outputs the set PAT flag and the block variable "n" to the reference frame memory control unit 133, and instructs the reference frame memory control unit 133 to output of the reference block (Step S303).

The reference frame memory control unit 133 selects reference blocks required to be read out based on the PAT flag and the block variable "n" received from the motion detection control unit 132 (Step S304). Then, the reference frame memory control unit 133 reads the selected reference block from the reference frame memory 131, and outputs the read reference block to the reference image data buffer 134 (Step S305).

Next, the motion detection control unit 132 identifies the set PAT flag (Step S306).

When the identified PAT flag is "1010" (Step S306), the motion detection control unit 132 specifies the block areas respectively having physical addresses "6", "7", "10", and "11" as the writing destination in the reference image data buffer 134 of the reference blocks outputted by Step S305, and writes the reference blocks to the specified block areas (Step S307).

Next, the motion detection control unit 132 sets the value of the physical address "7" to the parameter "t" (Step S308). This address is of the block area positioning at top right in the block areas specified as the writing destination by Step S307.

When the identified PAT flag is "0010" (Step S306), the motion detection control unit 132 specifies the block areas respectively having physical addresses "2", "3", "6", "7", "10", and "11" as the writing destination in the reference image data buffer 134 of the reference blocks outputted by Step S305, and writes the reference blocks to the specified block areas (Step S310).

Next, the motion detection control unit 132 sets the value of the physical address "3" to the parameter "t" (Step S311). This address is of the block area positioning at top right in the block areas specified as the writing destination by Step S310.

When the identified PAT flag is "0110" (Step S306), the motion detection control unit 132 specifies the block areas respectively having physical addresses "2", "3", "6", and "7" as the writing destination in the reference image data buffer 134 of the reference blocks outputted by Step S305, and writes the reference blocks to the specified block areas (Step S312).

Next, the motion detection control unit 132 sets the value of the physical address "3" to the parameter "t" (Step S313). This address is of the block area positioning at top right in the block areas specified as the writing destination by Step S312.

Then, K=0 is set to the parameter "k" (Step S315).

Next, the motion detection control unit 132 judges the PAT flag (Step S321). When the PAT flag is any of "1010", "1000", "0010", "0000", "0110", and "0100" (Step S321), the motion detection control unit 132 reads the reference block from the detection area in the reference image data buffer 134, reads the object block "n" from the object image data buffer 135, and outputs the read reference block and the object block "n" to the motion vector calculation unit 136. The motion vector calculation unit 136 calculates the motion vector (Step S322).

In parallel with Step S322, Steps S324 to S329 are performed.

The motion detection control unit 132 calculates "n'" by adding "1" to the block number "n", and set the PAT flag based on the block variable "n'" (Step S324).

Then, the motion detection control unit 132 outputs the calculated block variable "n'" and the PAT flag of the block variable "n'" to the reference frame memory control unit 133, and controls the reading and output of the reference block corresponding to the object block "n'" (Step S325).

The reference frame memory control unit 133 selects reference blocks required to be read out based on the received PAT flag and the block variable "n'" (Step S326). Then, the reference frame memory control unit 133 reads the selected reference block from the reference frame memory 131, and outputs the read reference block to the reference image data buffer 134 (Step S327).

Next, the motion detection control unit 132 selects the writing destination block area in the reference image data buffer 134 based on the PAT flag of the block variable "n'" and the parameter "k" (Step S328). Then, the motion detection control unit 132 writes the reference block outputted by Step S327 into the selected block area (Step S329).

The input unit 137 receives the object block "n+1" from the sort unit 102, writes the received object block "n+1" into the object image data buffer 135, and outputs the control signal indicating the reception of the object block to the motion detection control unit 132. The motion detection control unit 132 adds "1" to the block variable "n", and sets the PAT flag with use of the block variable "n" (Step S330).

When the judged PAT flag is "1001" or "0001" (Step S321), the motion detection control unit 132 reads the reference block from the detection area in the reference image data buffer 134, reads the object block "n" from the object image data buffer 135, outputs the read reference block and the object block "n" to the motion vector calculation unit 136. The motion vector calculation unit 136 receives the reference block and the object block "n", and calculates the motion vector based on the received reference block and the object block "n" (Step S335).

Next, the input unit 137 receives the object block from the sort unit 102, writes the received object block into the object image data buffer 135, and outputs the control signal indicating the reception of the object block to the motion detection control unit 132. The motion detection control unit 132 adds "1" to the block variable "n", and sets the PAT flag with use of the block variable (Step S336).

When the judged PAT flag is "0101" (Step S321), the motion detection control unit 132 reads the reference block from the detection area in the reference image data buffer 134, reads the object block "n" from the object image data buffer 135, outputs the read reference block and the object block "n" to the motion vector calculation unit 136. The motion vector calculation unit 136 receives the reference block and the object block "n", and calculates the motion vector based on the received reference block and the object block "n" (Step S337). Then, the motion detection control unit 132 finishes the operations for detecting motion vectors of one frame.

(2) Selection of reference block by the reference frame memory control unit 133.

Figure 9:
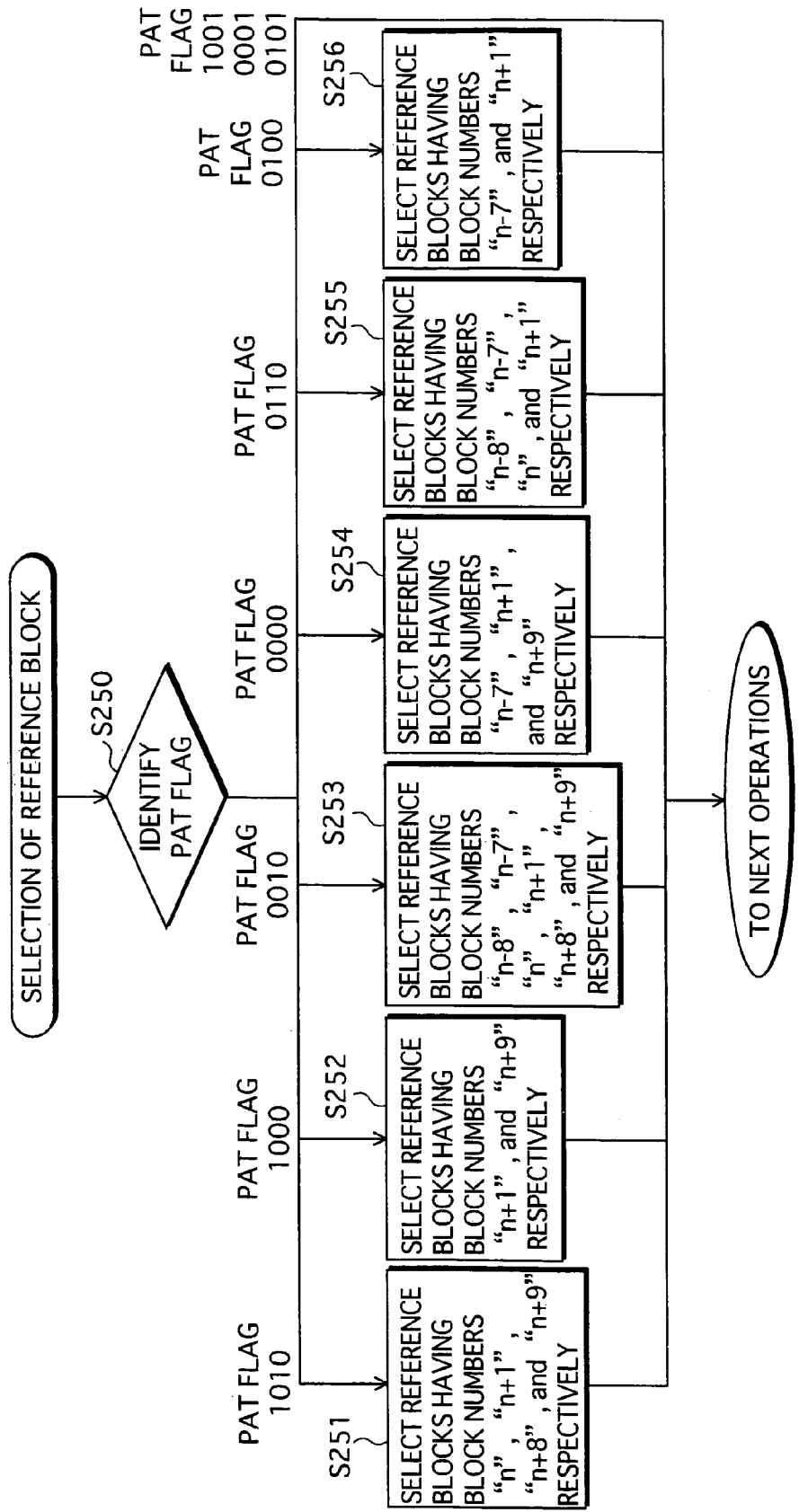
FIG. 9 is a flowchart showing operations for selecting a reference block performed by a reference frame memory control unit 133.

Operations for selecting the reference block that is to be transferred from the reference frame memory 131 to the reference image data buffer 134 are described next with reference to the flowchart in FIG. 9. Note that the following describes the Step S304 shown in FIG. 7 and the Step S 326 shown in FIG. 8 in detail.

When receiving the block variable "n" and the PAT flag from the motion detection control unit 132, the reference frame memory control unit 133 performs the following operations according to the received PAT flag (Step S250).

When the PAT flag is "1010" (Step S250), the reference frame memory control unit 133 selects reference blocks having block numbers "n", "n+1", "n+8", and "n+9" respectively (Step S251).

When the PAT flag is "1000" (Step S250), the reference frame memory control unit 133 selects reference blocks having block numbers "n+1" and "n+9" respectively (Step S252).

When the PAT flag is "0010" (Step S250), the reference frame memory control unit 133 selects reference blocks having block numbers "n−8", "n−7", "n", "n+1", "n+8", and "n+9" respectively (Step S253).

When the PAT flag is "0000" (Step S250), the reference frame memory control unit 133 selects reference blocks having block numbers "n−7", "n+1", and "n+9" respectively (Step S254).

When the PAT flag is "0110" (Step S250), the reference frame memory control unit 133 selects reference blocks having block numbers "n−8", "n−7", "n", and "n+1" respectively (Step S255).

When the PAT flag is "0100" (Step S250), the reference frame memory control unit 133 selects reference blocks having block numbers "n−7" and "n+1" respectively (Step S256).

When the PAT flag is "1001" or "0001" or "0101", the reference frame memory control unit 133 does not select any reference blocks and performs the next operation.

(3) Detection of Motion Vector of Each Object Block

Figure 10:
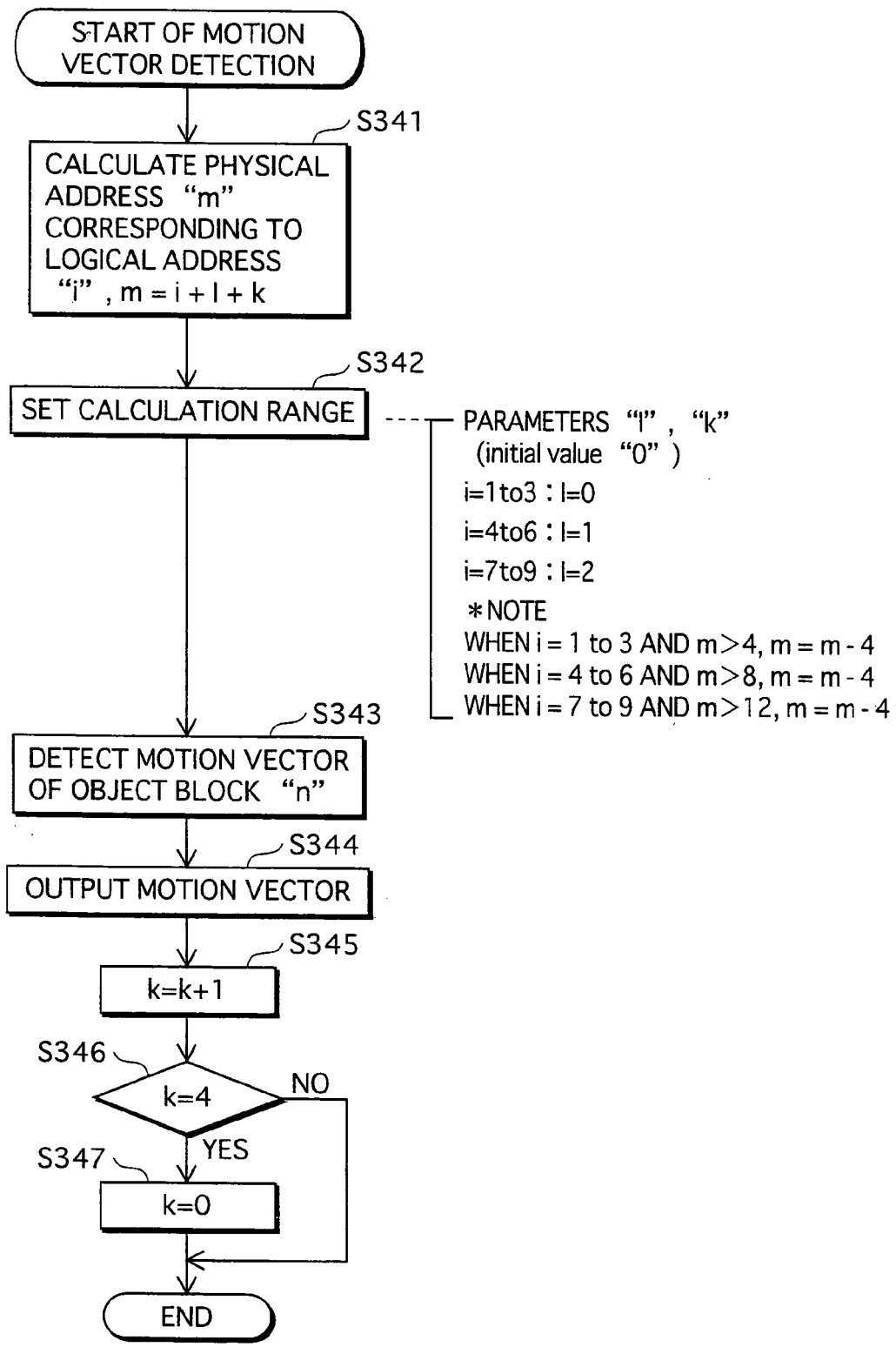
FIG. 10 is a flowchart showing operations for detecting a motion vector of each object block performed by a motion detection unit.

Operations for detecting the motion vector of each object block are described next with reference to the flowchart shown in FIG. 10. Note that the following describes the Steps S322, S335, and S337 in detail.

The physical address "m" corresponding to the logical address "i" (i=1 to 9) is derived by the formula "m=i+I+k" with use of the parameters "I" and "k" (Step S341). The parameter "I" varies according to the logical address "i". When i=1 to 3, I=0. When i=4 to 6, I=1. When i=7 to 9, I=2. The parameter "k" is in a range from 0 to 3 and its initial value is "0". Note that when i=1 to 3 and m>4, m=m−4. When i=4 to 6 and m>8, m=m−4. When i=7 to 9 and m>12, m=m−4. The area consisting of areas indicated by nine physical addresses derived from the above formulas is the detection area.

Next, the motion detection control unit 132 outputs the calculation range set to correspond to the PAT flag and the instruction for the motion vector detection to the motion vector calculation unit 136 (Step S342).

The motion vector calculation unit 136 detects the motion vector in the received calculation range according to the instruction from the motion detection control unit 132 (Step S343).

After the motion vector detection finishes, the motion detection control unit 132 outputs the detected motion vector to the predictive image generation unit 123 and the variable-length encoding unit 107 via the output unit 138 (Step S344).

Next, the motion detection control unit 132 adds "1" to the parameter "k" (Step S345). Here, the motion detection control unit 132 judges whether or not k=4 is satisfied (Step S346). When k=4, the motion detection control unit 132 sets "0" to "k". When k≠4 (Step S346), the motion detection control unit 132 skips such an operation and finishes the detection of the motion vector of each object block.

(4) Selection of Writing Destination of Reference Block

Figure 11:
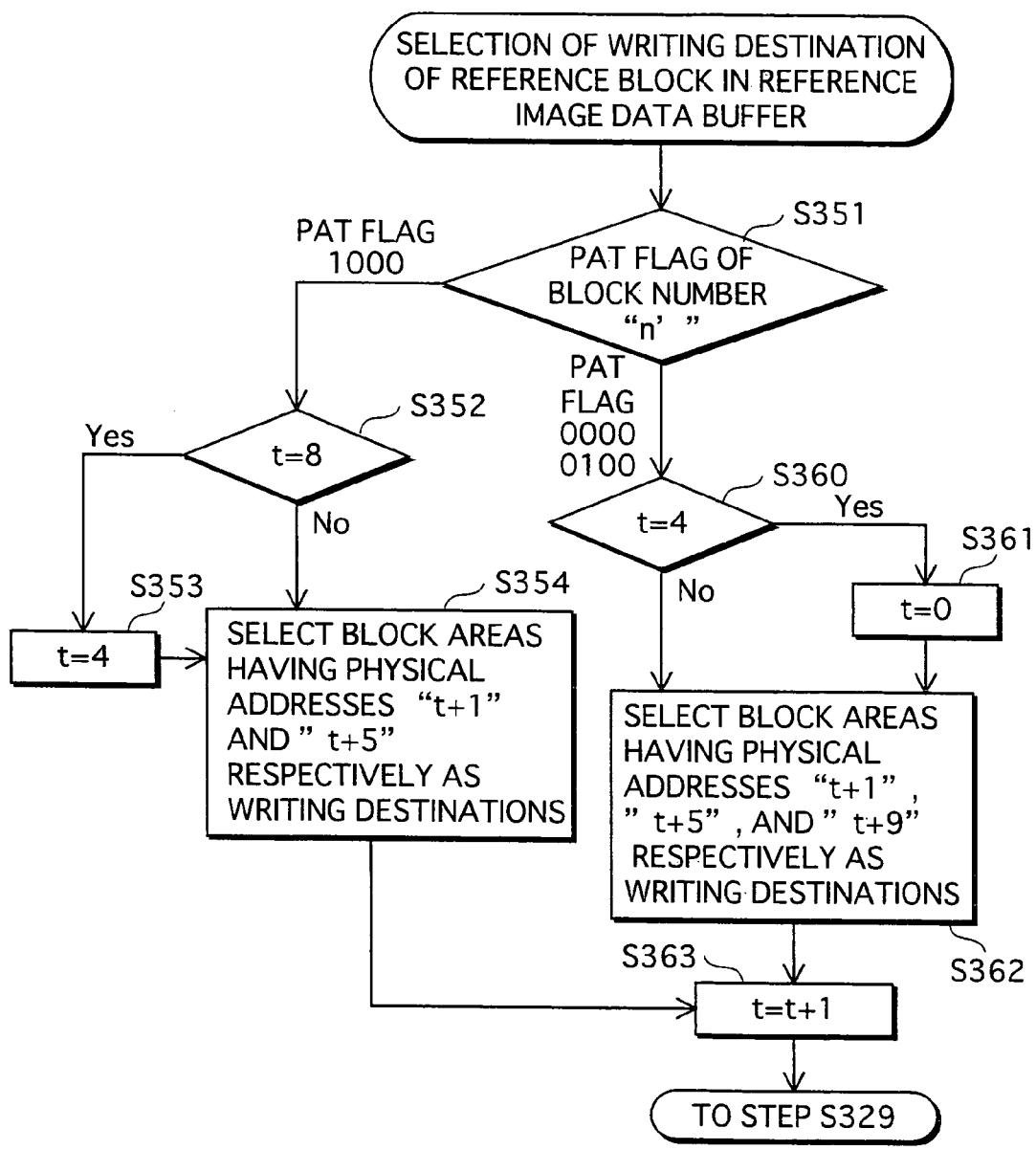
FIG. 11 is a flowchart showing operations for selecting a writing destination performed by a motion detection control unit 132.

Operations for selecting the block area in the reference image data buffer 134, which is to be the writing destination of the reference block outputted by the reference frame memory control unit 133, are described next with reference to the flowchart in FIG. 11. Note that the following describes Step S328 of the flowchart in FIG. 8 in detail.

The motion detection control unit 132 performs following processing based on the PAT flag derived from the block variable "n'" (Step S351).

When the PAT flag is "1000" (Step S351), the motion detection control unit 132 judges whether or not the parameter t=8 (Step S352). When t=8, the motion detection control unit 132 sets "4" to "t" (Step S353). When t≠8, the motion detection control unit 132 skips such an operation and performs Step S354.

Then, the motion detection control unit 132 specifies the block areas in the reference image data buffer 134 respectively having physical addresses of "t+1" and "t+5" as the writing destination areas of the reference block (Step S354), and performs Step S363.

When the PAT flag is "0000" or "0100" (Step S351 ), the motion detection control unit 132 judges whether or not the parameter t=4 (Step S360 ). When t=4, the motion detection control unit 132 sets "0" to "t" (Step S361 ). When t≠4, the motion detection control unit 132 skips such an operations and performs Step S362.

Then, the motion detection control unit 132 specifies the block areas in the reference image data buffer 134 respectively having physical addresses of "t+1", "t+5" and "t+9" as the writing destination area of the reference block (Step S362).

Then, the motion detection control unit 132 adds "1" to the parameter "t" (Step S363), and performs Step S329.

(5) Operations for Changing Detection Area Performed by Motion Detection Control Unit 132

In the reference image data buffer 134, the detection area and the writing destination of the reference block are determined with use of the above-described calculations. The detection area and the writing destination of the reference block change to the next areas every time one object block is processed. FIG. 12 shows the transitions of the detection area and the writing destination of the reference block during the detection of the motion vectors of the object blocks in the macroblock line in the first row of the object frame. The numbers in FIG. 12 represent the block numbers of the reference blocks stored in each block area. The following is the description of operations for changing the writing destination of the reference block and the detection area of the motion vector in the reference image data buffer 134.

Firstly, the reference frame memory control unit 133 outputs the reference block required for detecting the motion vector of the object block "1", according to the block variable "n=µl" and the PAT flag "1010". The outputted reference blocks "1", "2", "9", and "10" are respectively written into the block areas having physical addresses "6", "7", "10", and "11" as FIG. 12A shows.

Next, as FIG. 12B shows, the motion detection control unit 132 sets the area 13 consisting of 3 rows×3 columns of block areas as the detection area. The center of the area 13 is the block area storing the reference block "1". Then, the motion vector calculation unit 136 calculates the motion vector. At the same time, among the reference blocks required for detecting the motion vector of the object block "2", the reference blocks "3" and "11", which are not stored in the reference image data buffer 134, are written in to the block areas respectively having physical addresses "8" and "12" as FIG. 12B shows.

When the detection of the motion vector of the object block "1" finishes, as FIG. 12C shows, the motion detection control unit 132 sets the area 15 consisting of 3 rows×3 columns of block areas as the detection area. The center of the area 15 is the block area storing the reference block "2". At the same time, among the reference blocks required for detecting the motion vector of the object block "3", the reference blocks "4" and "12", which are not stored in the reference image data buffer 134, are written into the block areas respectively having physical addresses "5" and "9".

When the detection of the motion vector of the object block "2" finishes, as FIG. 12D shows, the motion detection control unit 132 sets the area 17a consisting of 3 rows×2 columns of block areas and the area 17b consisting of 3 rows×1 column of block areas as the detection area. The area 17a includes the block area storing the reference block "3". Then, the motion vector calculation unit 136 calculates the motion vector. Although the detection areas 17a and 17b are separated from each other, there is no problem because these are to be relocated on the logical address space as described above. At the same time, among the reference blocks required for detecting the motion vector of the object block "4", the reference blocks "5" and "13", which are not stored in the reference image data buffer 134, are written into the block areas respectively having physical addresses "6" and "10" as FIG. 12D shows.

When the detection of the motion vector of the object block "3" finishes, as FIG. 12E shows, the motion detection control unit 132 sets the area 19a consisting of 3 rows×1 column of block areas and the area 19b consisting of 3 rows×2 columns of block areas as the detection area. The area 19b includes the block area storing the reference block "4". Then, the motion vector calculation unit 136 calculates the motion vector. At the same time, among the reference blocks required for detecting the motion vector of the object block "5", the reference blocks "6" and "14", which are not stored in the reference image data buffer 134, are written into the block areas respectively having physical addresses "7" and "11" as FIG. 12E shows.

When the detection of the motion vector of the object block "4" finishes, as FIG. 12F shows, the motion detection control unit 132 sets the area 21 consisting of 3 rows×3 columns of block areas as the detection area. The center of the area 21 is the block area storing the reference block "5". Then, the motion vector calculation unit 136 calculates the motion vector. At the same time, among the reference blocks required for detecting the motion vector of the object block "6", the reference blocks "7" and "15", which are not stored in the reference image data buffer 134, are written into the block areas respectively having physical addresses "8" and "12" as FIG. 12F shows.

As described above, the operation, which is for writing the reference block into the block area outside of the detection area by moving the detection area by one row, is performed repeatedly.

1.5 Effects/Summary

As described above, according to the present invention, the reference image data buffer 134 consists of four memories 141 to 144, which can be controlled individually by the motion detection control unit 132.

The motion detection control unit 132 specifies the detection area in the reference image data buffer 134, reads the reference block stored in the detection area one pixel at a time, and outputs the read reference block to the motion vector calculation unit 136. At the same time, the motion detection control unit 132 writes the reference block required for detecting the motion vector of the next object block into the area that is not specified as the detection area. Here, the reference frame memory control unit 133 selects the reference block so that there is no duplication of the reference block in the reference image data buffer 134.

FIG. 13 shows the number of the reference blocks which are newly transferred from the reference frame memory 131 to the reference image data buffer 134 at the time of the detection of the motion vector of the object block on the object frame. With the conventional technology, the total number of the reference blocks transferred from the reference frame memory 131 to the reference image data buffer 134 is 484 per object frame. On the contrary, with the present invention, the total number is 176 per object frame. In this way, the present invention can reduce the redundant transfer of the reference block with the reference image data buffer 134 having small capacity. Therefore, the present invention can significantly reduce the total traffic.

2. The Second Embodiment

The following describes a moving picture camera 100 according to a preferred embodiment of the present invention.

2.1 Structure of Moving Picture Camera 100

A moving picture camera 100 includes a camera unit 101, a sort unit 102, a switch 103, a subtraction unit 104, a DCT unit 105, a quantization unit 106, a variable-length encoding unit 107, a buffer memory 108, a rate control unit 109, a main memory 110, a predictive image generation unit 123, an addition unit 124, an inverse DCT unit 125, an inverse quantization unit 126, a switch 127, a motion detection unit 130b, and a reference frame memory 131. The structures and the operations of the camera unit 101, the sort unit 102, the switch 103, the subtraction unit 104, the DCT unit 105, the quantization unit 106, the variable-length encoding unit 107, the buffer memory 108, the rate control unit 109, the main memory 110, the predictive image generation unit 123, the addition unit 124, the inverse DCT unit 125, the inverse quantization unit 126, the switch 127, and the reference frame memory 131 are the same as those in the first embodiment, and therefore the descriptions of them are omitted here.

2.2 Motion Detection Unit 130b

Figure 14:
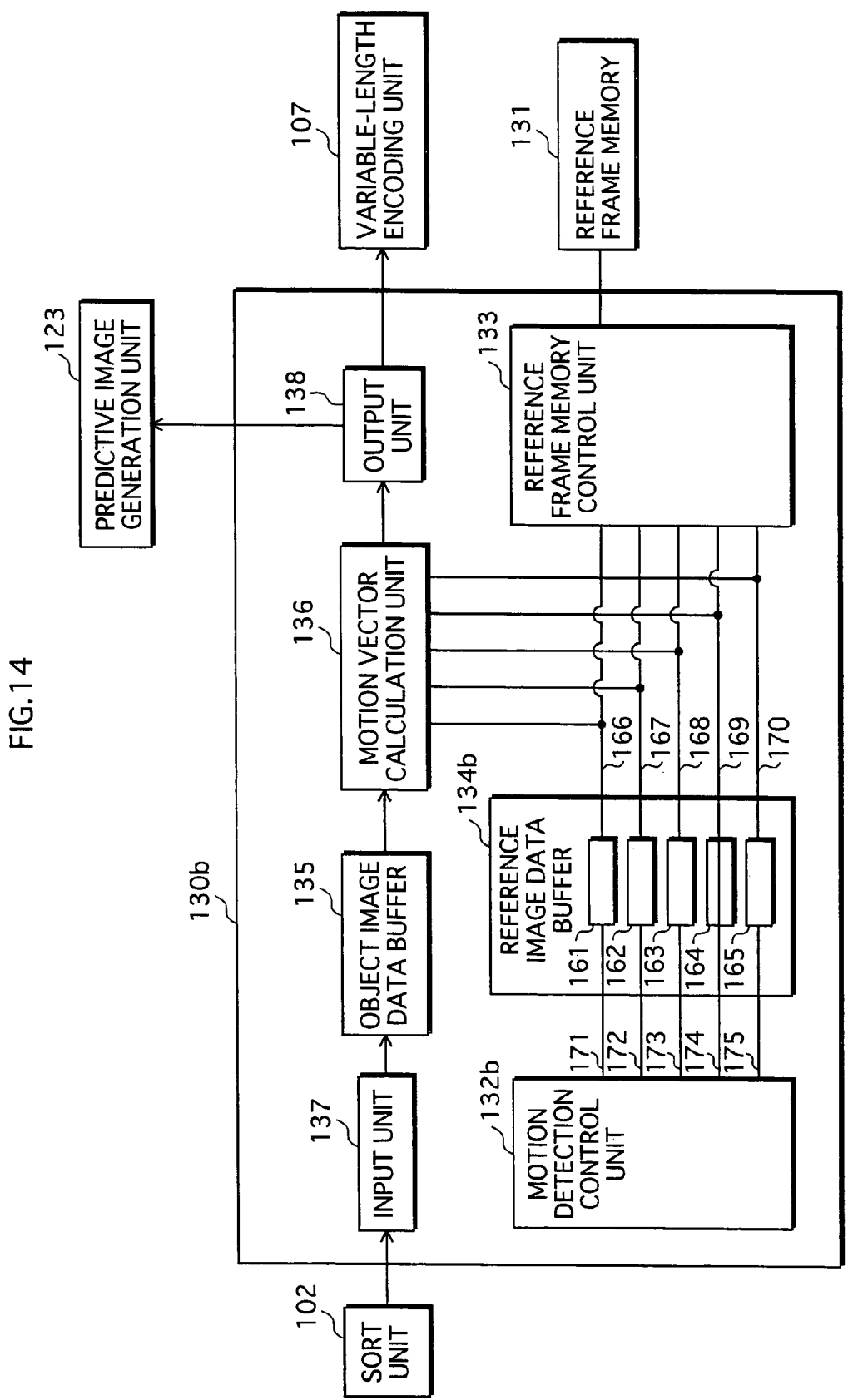
FIG. 14 is a block diagram showing a structure of a motion detection unit 130b in the second embodiment.

As FIG. 14 shows, the motion detection unit 130b includes a motion detection control unit 132b, a reference frame memory control unit 133, a reference image data buffer 134b, an object image data buffer 135, a motion vector calculation unit 136, an input unit 137, and an output unit 138. The structures and the operations of the reference frame memory control unit 133, the motion vector calculation unit 136, the input unit 137, and the output unit 138 are the same as those in the first embodiment, and the structure of the object image data buffer 135 is the same as tat in the first embodiment. Therefore, the descriptions of them are omitted here.

(1) Reference Image Data Buffer 134b

As FIG. 14 shows, the reference image data buffer 134b includes five memories 161 to 165, each having a capacity for storing 16 pixels×48 lines. These memories 161 to 165 are connected to the motion vector calculation unit 136 and the reference frame memory control unit 133 by individual busses 166 to 170 respectively. The memories 161 to 165 are also connected to the motion detection control unit 132b by individual busses 171 to 175 respectively.

Figure 15:
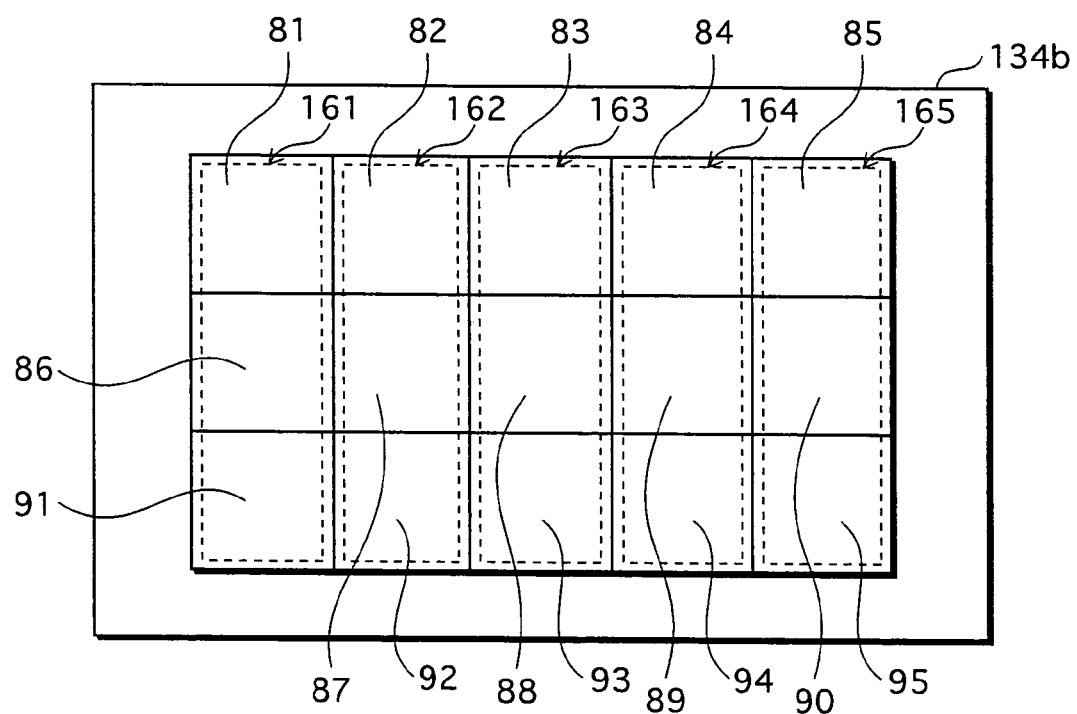
FIG. 15 is a block diagram showing a structure of a reference image data buffer 134b in the second embodiment.

Also, as FIG. 15 shows, the reference image data buffer 134b consists of fifteen block areas 81 to 95 disposed in a shape of a matrix having 3 rows and 5 columns. Each block area has a capacity for storing one macroblock. The memory 161 consists of block areas 81, 86, and 91 in the first column. The memory 162 consists of block areas 82, 87, and 92 in the second column. The memory 163 consists of block areas 83, 88, and 93 in the third column. The memory 164 consists of block areas 84, 89, and 94 in the fourth column. The memory 165 consists of block areas 85, 90, and 95 in the fifth column.

Physical addresses "1", "2", "3", "4", and "5" are respectively allocated to the block areas 81 to 85 in the first row. Physical addresses "6", "7", "8", "9", and "10" are respectively allocated to the block areas 86 to 90 in the second row. Physical addresses "11", "12", "13", "14", and "15" are respectively allocated to the block areas 91 to 95 in the third row. Each physical address indicates the position of a block area.

Each block area consists of memory cells disposed in a shape of a matrix having 16 rows and 16 columns. A cell address is allocated to each memory cell. More specifically, cell addresses 0 to 15 are respectively allocated to sixteen memory cells in the first row of the block area 81 having the physical address "1". Cell addresses 16 to 31 are respectively allocated to memory cells in the first row of the block area 82 having the physical address "2". Cell addresses 32 to 47 are respectively allocated to memory cells in the first row of the block area 83 having the physical address "3". Cell addresses 48 to 63 are respectively allocated to memory cells in the first row of the block 84 area having the physical address "4". Cell addresses 64 to 79 are respectively allocated to memory cells in the first row of the block 85 area having the physical address "5". Also, cell addresses 80 to 95 are respectively allocated to sixteen memory cells in the second row of the block area 81 having the physical address "1". Cell addresses 96 to 111 are respectively allocated to memory cells in the second row of the block area 82 having the physical address "2". Cell addresses 112 to 127 are respectively allocated to memory cells in the second row of the block area 83 having the physical address "3". Cell addresses 128 to 143 are respectively allocated to memory cells in the second row of the block area 84 having the physical address "4". Cell addresses 144 to 159 are respectively allocated to memory cells in the second row of the block area 85 having the physical address "5". In this way, consecutive cell addresses are allocated to eighty memory cells in each row, and cell addresses 0 to 3839 are respectively allocated to the 3840 memory cells constituting the reference image data buffer 134b.

The reference image data buffer 134b receives the reference block from the reference frame memory control unit 133, and stores the received reference block.

(2) Motion Detection Control Unit 132b

Motion Vector Detection for One Frame

The motion detection control unit 132b controls the motion vector detection for one frame image by the following operations (i) and (ii).

In the following description of the motion vector detection, a "reference area" means an area in a reference frame image including 3 rows×3 columns of reference blocks in such a manner that a reference block having the same number as the object block is included in the center of the reference blocks.

(i) Initialization

The motion detection control unit 132b receives the control signal indicating the beginning of a frame image from the input unit 137, sets "1" to a block variable "n", and controls the writing of the reference block required for detecting the motion vector of the object block "1" into the reference image data buffer 134b.

The motion detection control unit 132b stores a block variable "n" indicating a block number of an object block that is the object of the motion vector detection. When receiving a control signal indicating the reception of the object block from the input unit 137, the motion detection control unit 132b adds "1" to the block variable "n".

In particular, when receiving the control signal indicating the beginning of a frame image from the input unit 137, the motion detection control unit 132b sets "1" to the block variable "n".

The PAT flag is set in the same way as described in the first embodiment, and therefore its description is omitted here.

(ii) Repetitive Operations for Each Macroblock Line

The motion detection control unit 132b repeatedly performs the following operations (a) and (b) in parallel on object blocks "1" to "64".

(a) Detection of motion vectors in each object block (b) Writing of the reference block corresponding to the next object block The following is a detailed description of the operations (i) and (ii) described above.

(i) Initialization

When receiving the control signal indicating the beginning of a frame image from the input unit 137, the motion detection control unit 132b sets "1" to the block variable "n", and set "1010" to the PAT flag with use of the block number "n=1".

Next, the motion detection control unit 132b outputs the PAT flag "1010" and block number "n=1" to the reference frame memory control unit 133, and instructs the reference frame memory control unit 133 to read and output the reference block.

The motion detection control unit 132b stores the four reference blocks outputted by the reference frame memory 133 in block areas in the reference image data buffer 134b. These block areas have physical addresses "7", "8", "12", and "13" respectively, and they are predetermined as the writing destinations. Then, the motion detection control unit 132 sets "8"to the parameter "t". The parameter "t" is used for calculating the physical address of the block area that is the destination to write the reference image data buffer 134b. This destination block area is in the reference block corresponding to the succeeding object block. The parameter "t" is a variable within a range from 5 to 9. Every time the motion detection control unit 132b writes a reference block corresponding to one object block into the reference image data buffer 134b, a value "1" or "2" is added to the parameter "t", and a writing destination area in the reference image data buffer 134b, into which the reference block is to be written, moves to the next column or the column after the next one.

(ii) The motion detection control unit 132b repeatedly performs the following operations (a) and (b) in parallel on the object blocks "1" to "64". The motion detection control unit 132b can control the memories 161 to 165 individually, because the motion detection control unit 132b and the memories 161 to 165 in the reference image data buffer 134b are connected by individual busses 171 to 175 respectively. Therefore, the motion detection control unit 132b can read from the block area specified as the detection area and write into the block area outside of the detection area at the same time.

(a) Motion Vector Detection for Each Object Block

The motion detection control unit 132b controls the motion vector detection for each object block by the following operations ① to ③.

Figure 16:
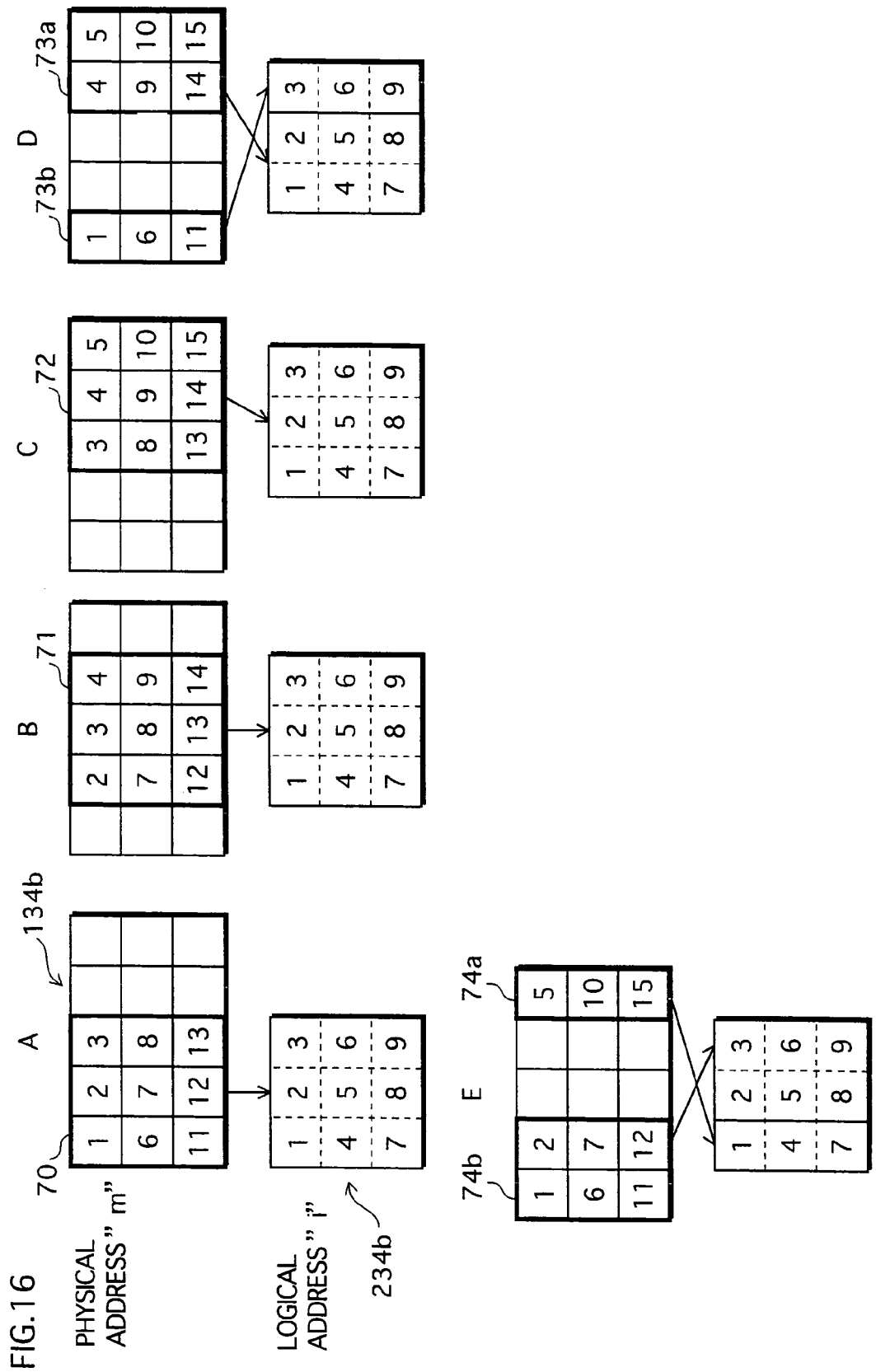
FIG. 16 shows a relationship between physical addresses of a reference image data buffer 134b and logical address space 234b used by a motion vector calculation unit.

① As FIG. 16 shows, in the motion vector detection, a logical address space 234b used by the motion vector calculation unit 136 consists of logical block areas disposed in a shape of matrix having 3 rows and 3 columns. Logical addresses "1", "2", and "3" are allocated to the three logical block areas in the first row respectively from left to right. Logical addresses "4", "5", and "6" are allocated to the three logical block areas in the second row respectively from left to right. Logical addresses "7", "8", and "9" are allocated to the three logical block areas in the third row respectively from left to right.

The logical addresses are not the same as the physical addresses of the reference image data buffer 134b. The motion detection control unit 132b calculates a physical address "m" (m=1 to 15) corresponding to the logical address "i" (i=1 to 12) by a formula "m=i+I+k". The area consisting of nine block areas, each having the calculated physical addresses "m", is the detection area of the object block "n". The block areas in the detection area correspond to the logical block areas in the logical address space in such a manner that a reference block having the same block number as the object block is placed in the center of the logical address space. The parameter "I" is determined by the logical address "i". When i=1 to 3, I=0. When i=4 to 6, I=2. When i=7 to 9, I=4. Note that when i=1 to 3 and m>5, m=m−5. Also, when i=4 to 6 and m>10, m=m−5. When i=7 to 9 and m>15, m=m−5.

The parameter "k" is, as described above, a variable within a range from 0 to 4. The detection area moves to the next column or the column after the next according to the parameter "k". The transition of the detection area according to the change of the parameter "k" is described next with reference to FIG. 16.

When k=0, the relation between the logical address "i" and the physical address "m" is "m=i+I", and as FIG. 16A shows, the area 70 including the block areas respectively having physical addresses "1", "2", "3", "6", "7", "8", "11", "12" and "13" becomes the detection area.

When k=1, the relation between the logical address "i" and the physical address "m" is "m=i+I+1", and as FIG. 16B shows, the area 71 including the block areas respectively having physical addresses "2", "3", "4", "7", "8", "9", "12", "13", and "14" becomes the detection area. When k=2, the relation between the logical address "i" and the physical address "m" is "m=i+I+2", and as FIG. 16C shows, the area 72 including the block areas respectively having physical addresses "3", "4", "5", "8", "9", "10", "13", "14", and "15" becomes the detection area. When k=3, the relation between the logical address "i" and the physical address "m" is "m=i+I+3", and as FIG. 16D shows, the area 73a including the block areas respectively having physical addresses "4", "5", "9", "10", "14", and "15", and the area 73b including the block areas respectively having physical addresses "1", "6", and "11" become the detection area. When k=4, the relation between the logical address "i" and the physical address "m" is "m=i+I+4", and as FIG. 16D shows, the area 74a including the block areas respectively having physical addresses "5", "10", and "15", and the area 74b including the block areas respectively having physical addresses "1", "2", "6", "7", "11" and "12" become the detection area.

② Next, the motion detection control unit 132b outputs the calculation range and the instruction to perform the motion vector detection to the motion vector calculation unit 136. The calculation range is the same as that in the first embodiment, and therefore the description is omitted here.

Then the motion detection control unit 132b repeats the following processing ②$_{-1}$ to ②$_{-4}$ until receiving a control signal from the motion vector calculation unit 136 indicating that the motion vector detection has finished. When receiving the control signal indicating that the motion vector detection has finished, the motion detection control unit 132b instructs the output unit 138 to output the detected motion vector to the predictive image generation unit 123 and the variable-length encoding unit 107.

②$_{-1}$ The motion detection control unit 132b receives a pixel position (p, j) on the object block and coordinates (x', y') on the logical address space from the motion vector calculation unit 136. The pixel position (p, j) on the object block and the coordinates (x', y') on the logical address space are the same as those in the first embodiment, therefore the description is omitted here.

②$_{-2}$ The motion detection control unit 132b reads image data corresponding to the received pixel position (p, j) from the object image data buffer 135, and outputs the read image data to the motion vector calculation unit 136.

②₋₃ The motion detection control unit 132b converts the received coordinates (x', y') on the logical address space into a cell address.

More specifically, firstly, the motion detection control unit 132b judges the value of the parameter "k". When k=0, the motion detection control unit 132 calculates X=x'+16 and Y=y'+16. When k=1, the motion detection control unit 132 calculates X=x'+32 and Y=y'+16. When k=2, the motion detection control unit 132 calculates X=x'+48, and Y=y'+16. When k=3, the motion detection control unit 132b calculates X=x'+64 (x'≦15), X=x'−16 (x'≧16), and Y=y'+16. When k=4, the motion detection control unit 132b calculates X=x'+80 (x'≦−1), X=x'(x'≧0), and Y=y'+16.

Here, X corresponds to each column of 48 rows×80 columns of memory cells constituting the reference image data buffer 134b on one-to-one basis, and indicates the column including the memory cell whose cell address is to be calculated. Y corresponds to each row of 48 rows×80 columns of memory cells constituting the reference image data buffer 134b on one-to-one basis, and indicates the row including the memory cell whose cell address is to be calculated. (0≦X≦79, 0≦Y≦47).

Then, the motion detection control unit 132b calculates the cell address "X+80Y".

②₋₄ The motion detection control unit 132b reads the image data stored in the memory cell having the calculated cell address, and outputs the read pixel data to the motion vector calculation unit 136.

③ The motion detection control unit 132b judges the PAT flag.

When the PAT flag is "1001" or "0001" (indicating the last object block in the macroblock line), the motion detection control unit 132b adds "2" to the parameter "k". When the PAT flag is any of "1010", "1000", "0010", "0000", "0110", and "0100", the motion detection control unit 132b adds "1" to the parameter "k".

After performing the calculation above, the motion detection control unit 132b judges whether or not k≧5. When k≧5, the motion detection control unit 132b subtracts "5" from "k". When k<5, the motion detection control unit 132b skips such an operation, and performs the next operation.

When the PAT flag is judged as "0101" (the object block "64"), the motion detection control unit 132b skips the above-described addition, and finishes the detection of the motion vectors of one frame.

(b) Writing of the Reference Block Corresponding to the Next Object Block

The motion detection control unit 132b writes the reference block corresponding to the next object of the motion detection into the reference image data buffer 134b according to the following operations.

The motion detection control unit 132b judges whether or not the PAT flag is "0101" (the object block "64"). When the PAT flag is "0101", the operation (a) finishes and the detection of the motion vectors of one frame finishes.

When the PAT flag is not "0101", the motion detection control unit 132b calculates n'=n+1 by adding "1" to the block number "n", and sets the PAT flag with use of the block variable "n'".

Then the motion detection control unit 132b outputs the value of the block variable "n'" and the PAT flag to the reference frame memory control unit 133, and controls the reading of the reference block and the output of the read reference block to the reference image data buffer 134b.

Next, the motion detection control unit 132b selects the writing destination of the reference block in the reference image data buffer 134b according to the following operations.

Firstly, the motion detection control unit 132b judges whether or not the parameter "t≧10 satisfies t≧10. When t≧10, the motion detection control unit 132b subtracts "5" from "t". When t<10, the motion detection control unit 132b skips this subtraction, and performs the next operation.

Next, the motion detection control unit 132b selects the writing destination of the reference block in the reference image data buffer 134b according to the PAT flag of the block variable "n'" in the following manner.

When the PAT flag of the block variable "n'" is "1000", the motion detection control unit 132b specifies block areas respectively having physical addresses "t+1" and "t+6" as the writing destination areas, and adds "1" to the parameter "t".

When the PAT flag of the block variable "n'" is "0010", the motion detection control unit 132b specifies block areas respectively having physical addresses "t−4", "t−3", "t+1", "t+2", "t+6", and "t+7" as the writing destination areas. Here, the motion detection control unit 132b judges whether or not "t+7≧16". When t+7≧16, the motion detection control unit 132b specifies block area having a physical address "t−8" as the writing destination area instead of the block area having a physical address "t+7". When t+7<16, the motion detection control unit 132b skips such an operation, and adds "2" to the parameter "t".

When the PAT flag of the block variable "n'" is "0000", the motion detection control unit 132b specifies block areas respectively having physical addresses "t−4", "t+1" and "t+6" as the writing destination areas, and adds "1" to the parameter "t".

When the PAT flag of the block variable "n'" is "0110", the motion detection control unit 132b specifies block areas respectively having physical addresses "t−4", "t−3", "t+1" and "t+2" as the writing destination areas. Here, the motion detection control unit 132b judges whether or not "t+2≦11". When t+2≧11, the motion detection control unit 132b specifies the block area having a physical address "t−8" as the writing destination area instead of the block area having a physical address "t+2". When t+2<11, the motion detection control unit 132b skips such an operation, and adds "2" to the parameter "t".

When the PAT flag of the block variable "n'" is "0100", the motion detection control unit 132b specifies block areas respectively having physical addresses "t−4" and "t+1" as the writing destination areas, and adds "1" to the parameter "t".

When the PAT flag of the block variable "n'" is "1001" or "0001", the motion detection control unit 132b does not specify any block areas as the writing destination areas, and adds "1" to the parameter "t".

As described above, the motion detection control unit 132b writes the reference blocks outputted by the reference frame memory control unit 133 into the block areas specified as the writing destinations according to the PAT flag of "n'".

When receiving the control signal indicating the reception of the object block from the input unit 137, the emotion detection control unit 132b adds "1" to the block variable "n", and sets the PAT flag based on the block variable "n" that is the result of the addition.

2.3 Operations of Motion Detection Unit 130b

(1) Operations for Detecting Motion Vectors of One Frame

Operations for detecting motion vectors of one frame is explained next with reference to flowcharts shown in FIG. 17 and FIG. 18.

The input unit 137 receives the object block "1" and the control signal indicating the beginning of a frame image from the sort unit 102, writes the received object block "1" into the object image data buffer 135, and outputs the control signal indicating the beginning of the frame image to the motion detection control unit 132b. The motion detection control unit 132b sets "n=1" to the block variable "n", and sets the PAT flag "1010" derived from the block variable (Step S401).

The motion detection control unit 132b outputs the set PAT flag "1010" and the block number "n=1" to the reference frame memory control unit 133, and controls the reading of the reference block and the output of the read reference block to the reference image data buffer 134b (Step S402).

The reference frame memory control unit 133 selects reference blocks required to be read out based on the PAT flag and the block number "n=1" received from the motion detection control unit 132b (Step S403). Then, the reference frame memory control unit 133 reads the selected reference block, and outputs the read reference block to the reference image data buffer 134b (Step S404). The operations for selecting the reference block performed by the reference frame memory control unit 133 are the same as those in the first embodiment, and therefore their description is omitted here.

Next, the reference frame memory control unit 133 writes the reference blocks outputted in Step S404 into block areas respectively having physical addresses "7", "8", "12" and "13" in the reference image data buffer 134b (Step S405).

Then, the reference frame memory control unit 133 sets "8" to the parameter "t", and sets "0" to the parameter "k" (Step S406).

In Steps S407 to S428, the operations in Steps S410 to S427 are performed repeatedly until all the object blocks respectively having object numbers 1 to 64 constituting one object frame are processed.

The motion detection control unit 132b instructs the motion vector calculation unit 136 to detect the motion vector, and the motion vector calculation unit 136 calculates the motion vector (Step S410).

In parallel with Step S410, Steps S420 to S427 are performed. Firstly, the motion detection control unit 132b judges whether or not the PAT flag of the block variable "n" is "0101" (Step S420). When the PAT is "0101", the motion detection control unit 132b finishes Step S410, and finishes repeating the detection of motion vectors of each object block (Step S428).

When the PAT is not "0101" (Step S420), the motion detection control unit 132b calculates the block variable n'=n+1, and sets the PAT flag of the block variable n' (Step S421).

Then the motion detection control unit 132b outputs the block variable "n'" and the set PAT flag of "n'" to the reference frame memory control unit 133 (Step S422).

The reference frame memory control unit 133 selects reference blocks required to be read out based on the received PAT flag and the block variable "n'" (Step S423), and outputs the selected reference block to the reference image data buffer 134b (Step S424).

Then, the motion detection control unit 132b selects the writing destination in the reference image data buffer 134b, into which the reference block outputted by Step S424 is to be written (Step S425).

The motion detection control unit 132b stores the reference block outputted by Step S424 in the block area selected by Step S425 as the writing destination (Step S426).

The input unit 137 receives the object block "n+1" from the sort unit 102, write the received object block "n+1" into the object image data buffer 135, and outputs the control signal indicating the reception of the object block to the motion detection control unit 132b. When receiving the control signal indicating the reception of the object block, the motion detection control unit 132b adds "1" to the block variable "n" and sets the PAT flag with use of the block variable "n" that is the result of the addition (Step S427).

Figure 17:
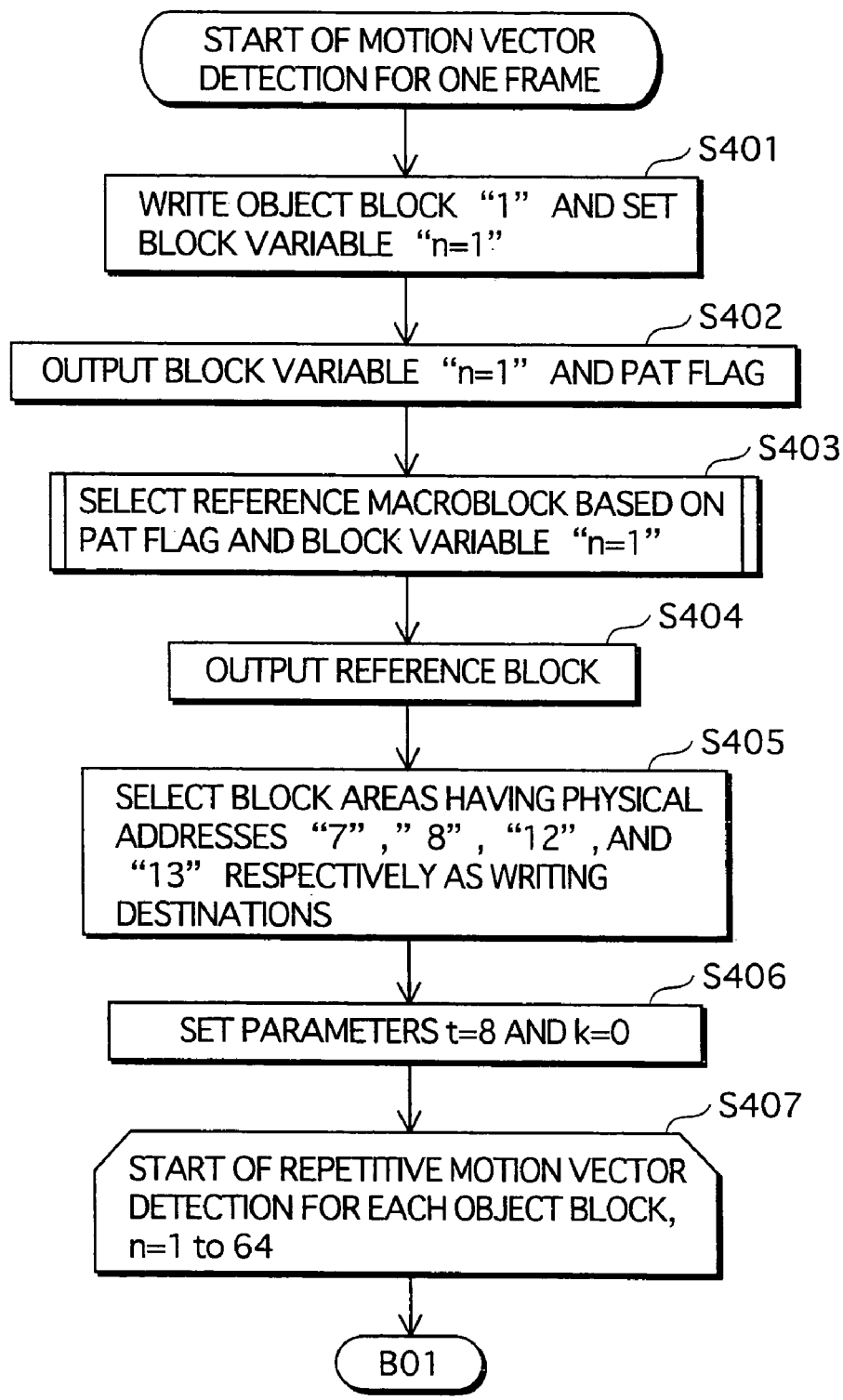
FIG. 17 is a flowchart showing operations for detecting motion vectors of object blocks constituting one frame performed by a motion detection unit 130b (Continued on FIG. 18)
Figure 18:
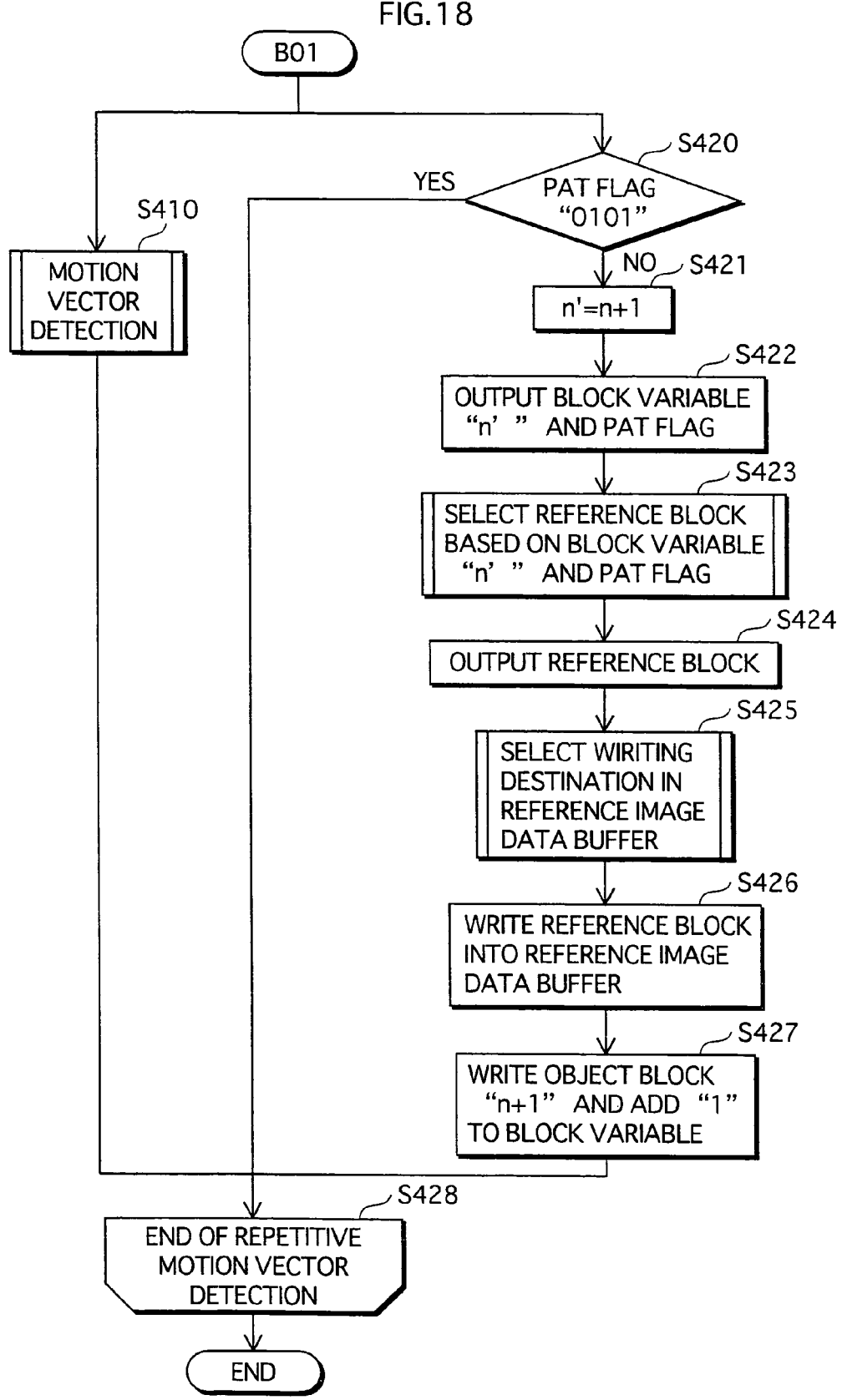
FIG. 18 is a flowchart showing operations for detecting motion vectors of object blocks constituting one frame performed by a motion detection unit 130b (Continued from FIG. 17)

Note that the selection of the reference block performed in Step S403 in FIG. 17 and Step S423 in FIG. 18 are the same as that performed in the first embodiment, and therefore the description is omitted here.

Figure 19:
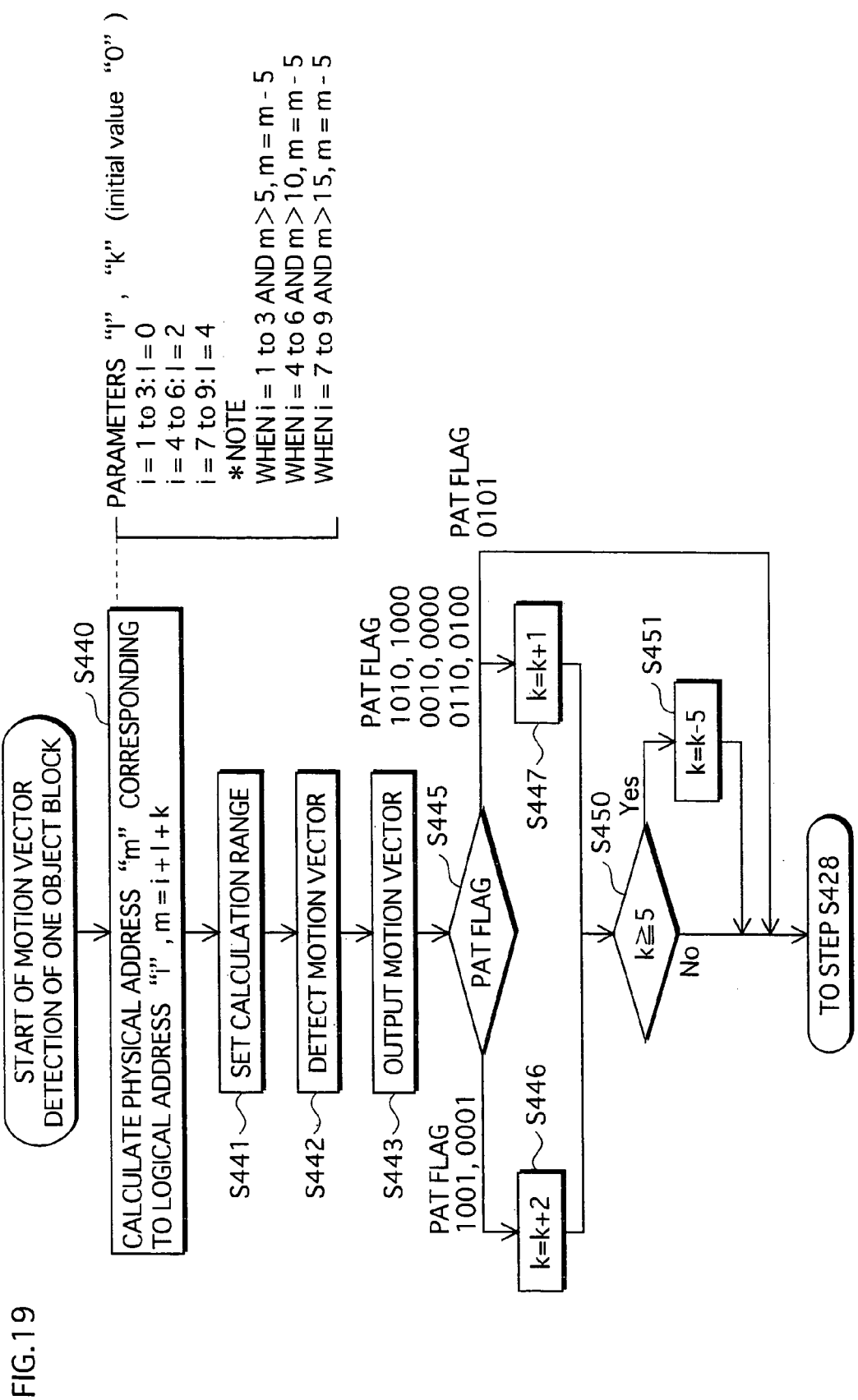
FIG. 19 is a flowchart showing operations for detecting motion vectors of one object block performed by a motion detection unit 130b.

(2) Detection of motion vector of one object block Operations for detecting the motion vector of one object block is described next with reference to the flowchart shown in FIG. 19. Note that the following describes the Step S410 in FIG. 18 in detail.

The motion detection control unit 132b calculates the physical address "m" corresponding to the logical address "i" by the formula "m=i+I+k" with use of the parameters "I" and "k" (Step S440). The parameter "I" varies according to the logical address "i". When i=1 to 3, I=0. When i=4 to 6, I=2. When i=7 to 9, I=4. The parameter "k" is in a range from 0 to 4, and varies as the detection of the motion vector of one frame proceeds. Note that when i=1 to 3 and m>5, m=m−5. When i=4 to 6 and m>10, m=m−5. When i=7 to 9 and m>15, m=m−5. The area consisting of areas indicated by nine physical addresses derived from the above formulas is the detection area.

Next, the motion detection control unit 132b outputs the calculation range and the instruction of the motion vector detection to the motion vector calculation unit 136 (Step S441).

The motion vector calculation unit 136 receives the instruction from the motion detection control unit 132b, and calculates the motion vectors included in the calculation range (Step S442).

When the calculation of the motion vectors finishes, the motion detection control unit 132b outputs the calculated motion vectors to the predictive image generation unit 123 and the variable-length encoding unit 107 via the output unit 138 (Step S443).

Then, the motion detection control unit 132b judges the PAT flag of the block variable "n". When the PAT flag is "1001" or "0001", the motion detection control unit 132b adds "2" to the parameter "k" (Step S446). When the PAT flag is any of "1010", "1000", "0010", "0000", "0110", and "0100", the motion detection control unit 132b adds "1" to the parameter "k" (Step S447). Here, the motion detection control unit 132b judges whether or not k≦5 (Step S450). When k≦5, the motion detection control unit 132b subtracts "5" from "k" (Step S451). When k<5 (Step S450), the motion detection control unit 132b finishes the detection of the motion vector of one object block, and performs Step S428.

When the PAT flag is judged as "0101" (Step S445), motion detection control unit 132b skips such an operation, and performs Step S428.

(3) Selection of Writing Destination of Reference Block

Figure 20:
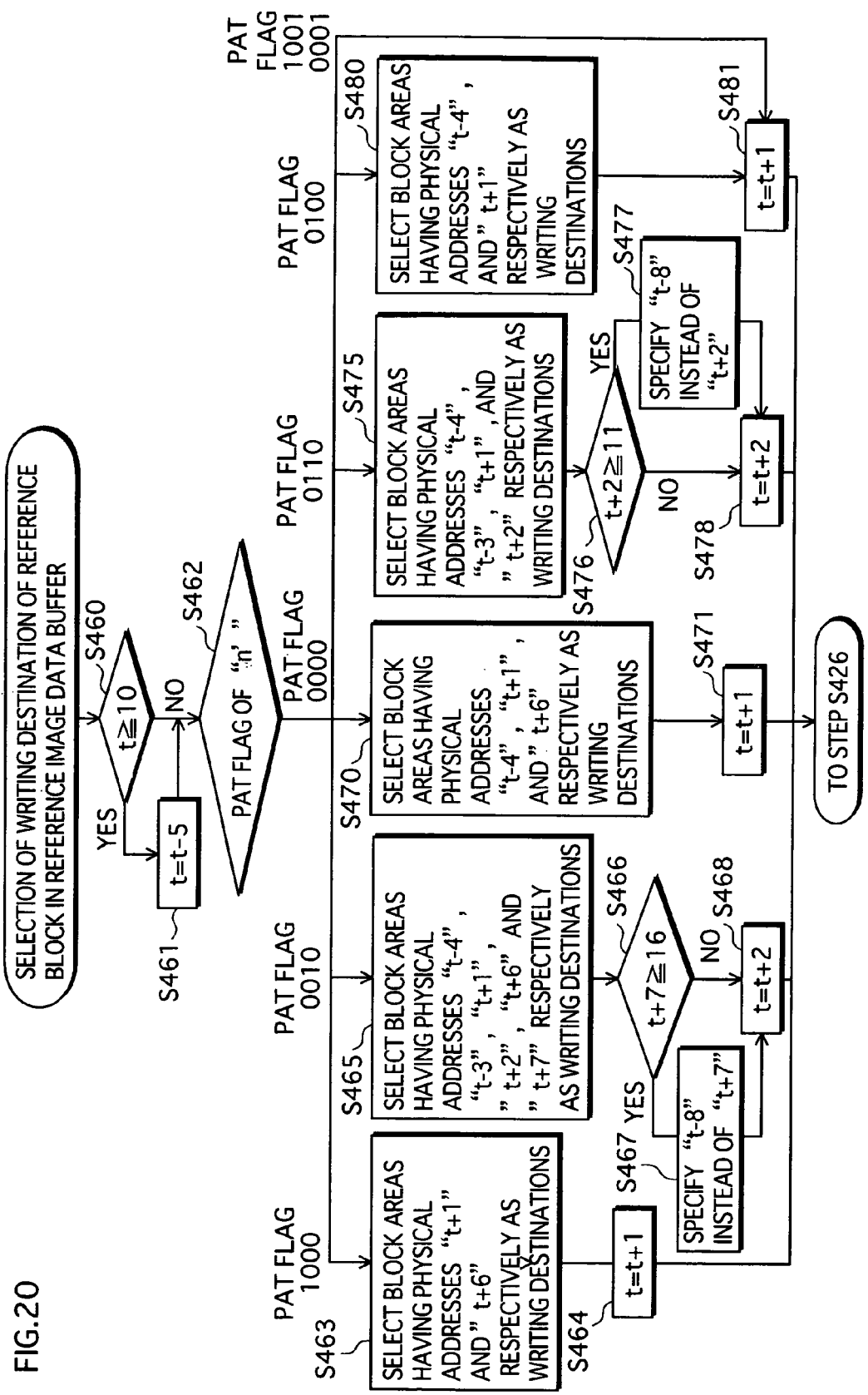
FIG. 20 is a flowchart showing operations for selecting a writing destination performed by a motion detection control unit 132b.

Operations for selecting the block area in the reference image data buffer 134b, which is to be the writing destination of the reference block, are described next with reference to the flowchart in FIG. 20. Note that the following describes Step S425 of the flowchart in FIG. 18 in detail.

The motion detection control unit 132b selects the writing destination based on the PAT flag of the block variable "n'" and the parameter "t".

Firstly, the motion detection control unit 132b judges whether or not the parameter "t" satisfies t≧10 (Step S460). When t≧10, the motion detection control unit 132b subtracts "5" from the parameter "t", which means "t=t−5" (Step S461). When t<10, the motion detection control unit 132b skips such a calculation, and performs Step S462.

Then the motion detection control unit 132b judges the PAT flag of the block variable "n'" (Step S462), and selects the writing destination according to the PAT flag.

When the PAT flag is "1000" (Step S462), the motion detection control unit 132b specifies the block areas respectively having physical addresses "t+1" and "t+6" as the writing destination areas (Step S463), adds "1" to the parameter "t" (Step S464), and finishes the selection of the writing destination. Then, the processing jumps to the Step S426.

When the PAT flag of the block variable "n'" is "0010" (Step S462), the motion detection control unit 132b specifies the block areas respectively having physical addresses "t–4", "t–3", "t+1", "t+2", "t+6", and "t+7" as the writing destination areas (Step S465). Then the motion detection control unit 132b judges whether or not t+7≧16 (Step S466). When t+7≧16, the motion detection control unit 132b specifies block area having a physical address "t–8" as the writing destination area instead of the block area having a physical address "t+7" (Step S467). When t+7<16, the motion detection control unit 132b skips such an operation and performs Step S468. Then the motion detection control unit 132b adds "2" to the parameter "t" (Step S468), finishes the selection of the writing destination, and performs Step S426.

When the PAT flag of the block variable "n'" is "0000" (Step S462), the motion detection control unit 132b specifies block areas respectively having physical addresses "t–4", "t+1" and "t+6" as the writing destination areas (Step S470), adds "1" to the parameter "t" (Step S471), finishes the selection of the writing destination, and performs Step S426.

When the PAT flag of the block variable "n'" is "0110" (Step S462), the motion detection control unit 132b specifies block areas respectively having physical addresses "t–4", "t–3", "t+1" and "t+2" as the writing destination areas (Step S475). Then, the motion detection control unit 132b judges whether or not "t+2≧11" (Step S476). When t+2≧11, the motion detection control unit 132b specifies the block area having a physical address "t–8" as the writing destination area instead of the block area having a physical address "t+2" (Step S477). When t+2<11, the motion detection control unit 132b skips such an operation, and performs Step S478. Then, the motion detection control unit 132b adds "2" to the parameter "t" (Step S478), finishes the selection of the writing destination, and performs Step S426.

When the PAT flag of the block variable "n'" is "0100" (Step S462), the motion detection control unit 132b specifies block areas respectively having physical addresses "t–4" and "t+1" as the writing destination areas (Step S480), adds "1" to the parameter "t" (Step S481), finishes the selection of the writing destination, and performs Step S426.

When the PAT flag of the block variable "n'" is "1001" or "0001" (Step S462), the motion detection control unit 132b does not specify any block areas as the writing destination areas, and performs Step S481.

(4) Operations for Changing Detection Area Performed by Motion Detection Control Unit 132b The detection area and the writing destination of the reference block in the reference image data buffer 134b are set by the above-described calculations, and the detection area and the writing destination of the reference block moves to the next area every time one object block is processed. FIG. 21 shows the transition of the detection area and the writing destination of the reference block during the detection of the motion vectors of object blocks in one object frame. The numbers in FIG. 21 represent the block numbers of the reference blocks stored in each block area. The following is the description of operations for changing the writing destination of the reference block and the detection area of the motion vector in the reference image data buffer 134b.

The detection of the object blocks "1" to "6" is the same as that performed in the first embodiment, in which the detection area and the destination block area move one row at a time. Therefore, its description is omitted here. Following is the description of the detection of object blocks "7" and later.

Figure 21A:
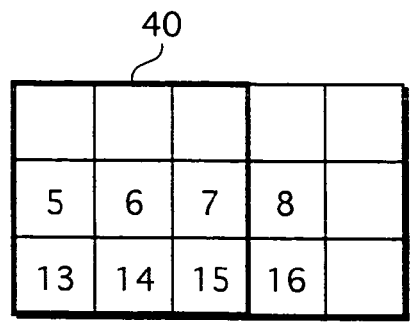
FIGS. 21A through 21E show a transition of a detection area in a reference image data buffer 134b.

As FIG. 21A shows, the motion detection control unit 132b sets the area 40 consisting of 3 rows×3 columns of block areas as the detection area, and detects the motion vector of the object block "6". The center of the area 40 is the block area storing the reference block "6". At the same time, among the reference blocks required for detecting the motion vector of the object block "7", the reference blocks "8" and "16", which are not stored in the reference image data buffer 134b, are written into the block areas respectively having physical addresses "9" and "14".

Figure 21B:
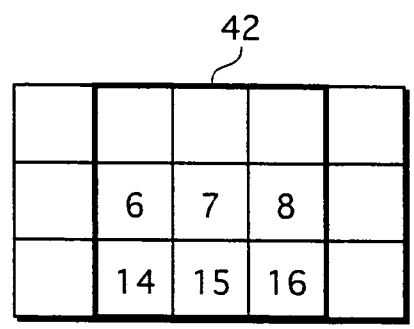

When the detection of the motion vector of the object block "6" finishes, as FIG. 21B shows, the motion detection control unit 132b sets the area 42 consisting of 3 rows×3 columns of block areas as the detection area, and detects the motion vector of the object block "7". The center of the area 42 is the block area storing the reference block "7". At this point of time, the reference blocks required for detecting the motion vector of the object block "8" are already written in the reference image data buffer 134b. Therefore, the data transfer from the reference frame memory 131 to the reference image data buffer 134b does not occur.

Figure 21C:
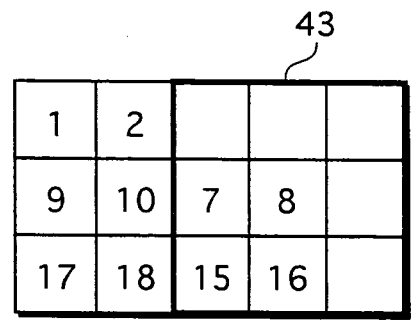

When the detection of the motion vector of the object block "7" finishes, as FIG. 21C shows, the motion detection control unit 132b sets the area 43 consisting of 3 rows×3 columns of block areas as the detection area, and detects the motion vector of the object block "8". The center of the area 43 is the block area storing the reference block "8". At the same time, the reference blocks "1", "2", "9", "10", "17", and "18", which are required for detecting the motion vector of the object block "9", are written into the block areas respectively having physical addresses "1", "2", "6", "7", "11", and "12".

Figure 21D:
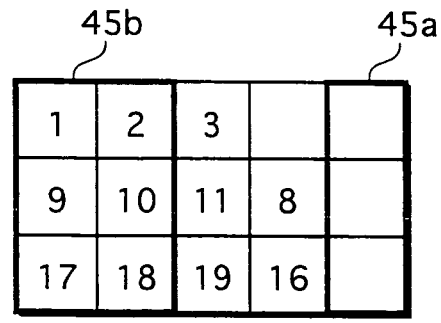
Figure 21E:
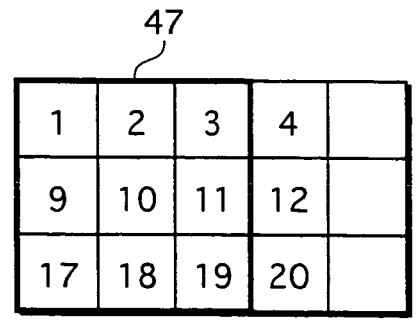

When the detection of the motion vector of the object block "8" finishes, as FIG. 21D shows, the motion detection control unit 132b sets the area 45a consisting of 3 rows×1 column of block areas and the area 45b consisting of 3 rows×2 columns of block areas as the detection area, and performs the motion vector detection. The area 45b includes the block area storing the reference block "9". At the same time, among the reference blocks required for detecting the motion vector of the object block "10", the reference blocks "3", "11", and "19", which are not stored in the reference image data buffer 134b, are written into the block areas respectively having physical addresses "3", "8", and "13".

In this way, the operation for setting the detection area and the destination block are performed repeatedly by moving those areas by one or two rows at a time until the motion vector detection of sixty-four object blocks constituting one frame finishes.

2.5 Effects of the Second Embodiment

According to the present invention, the reference image data buffer 134b consists of five memories 161 to 165, which can be controlled individually by the motion detection control unit 132b.

The motion detection control unit 132b specifies the detection area in the reference image data buffer 134b, reads the reference block stored in the detection area, and outputs the read reference block to the motion vector calculation unit

136. At the same time, the motion detection control unit 132b writes the reference block required for detecting the motion vector of the next object block into the area that is not specified as the detection area. Here, the reference frame memory control unit 133 selects the reference block so that there is no duplication of the reference block in the reference image data buffer 134b.

With this structure, the total number of the reference blocks transferred from the reference frame memory 131 to the reference image data buffer 134b is 176 per object frame, which means that the data traffic is significantly reduced.

Further, with the structure according to the second embodiment, the processing speed of the vector detection for one frame image is higher than that in the first embodiment.

The number of the reference blocks newly transferred from the reference frame memory 131 to the reference image data buffer 134b for detecting the motion vector of each object block is, as FIG. 13 shows, four or six in the top object block in the macroblock line. However, in the first embodiment, the reference image data buffer 134 consists of 3 rows×4 columns of block areas, and block areas not specified as the detection areas have capacity of only for 3 macroblocks. Therefore, during the detection of the motion vector of the last object block in a macroblock line, it is impossible to write the reference block corresponding to the top object block in the next macroblock line into the reference image data buffer 134. This means that in the first embodiment, the writing of the reference block corresponding to the top object block in the next macroblock line is performed after the detection of the motion vector of the last object block in the macroblock line finishes. Therefore, waiting period is required.

In the second embodiment, the reference image data buffer 134b consists of 3 rows×5 columns of block areas, and block areas for six macroblocks are always not specified as the detection area. Therefore, it is possible to write the reference block corresponding to the top object block in the next macroblock line into the reference image data buffer 134b during the detection of the motion vector of the last object block in the macroblock line. This means that the waiting period, which is required in the first embodiment, is not required in the second embodiment. The motion vector detection and the writing of the reference blocks corresponding to the next object blocks are performed in parallel for all the sixty-four object blocks constituting the object frame.

This realizes higher processing speed of the motion vector detection for one frame.

3. Modifications

The present invention has been explained based on the above-described embodiments so far. However, the present invention is not limited to those embodiments as a matter of course. The following are included in the present invention.

(1) The writing into the reference frame memory 131 and the reading from the reference frame memory 131 in the first and second embodiments may be modified as follows.

Figure 22:
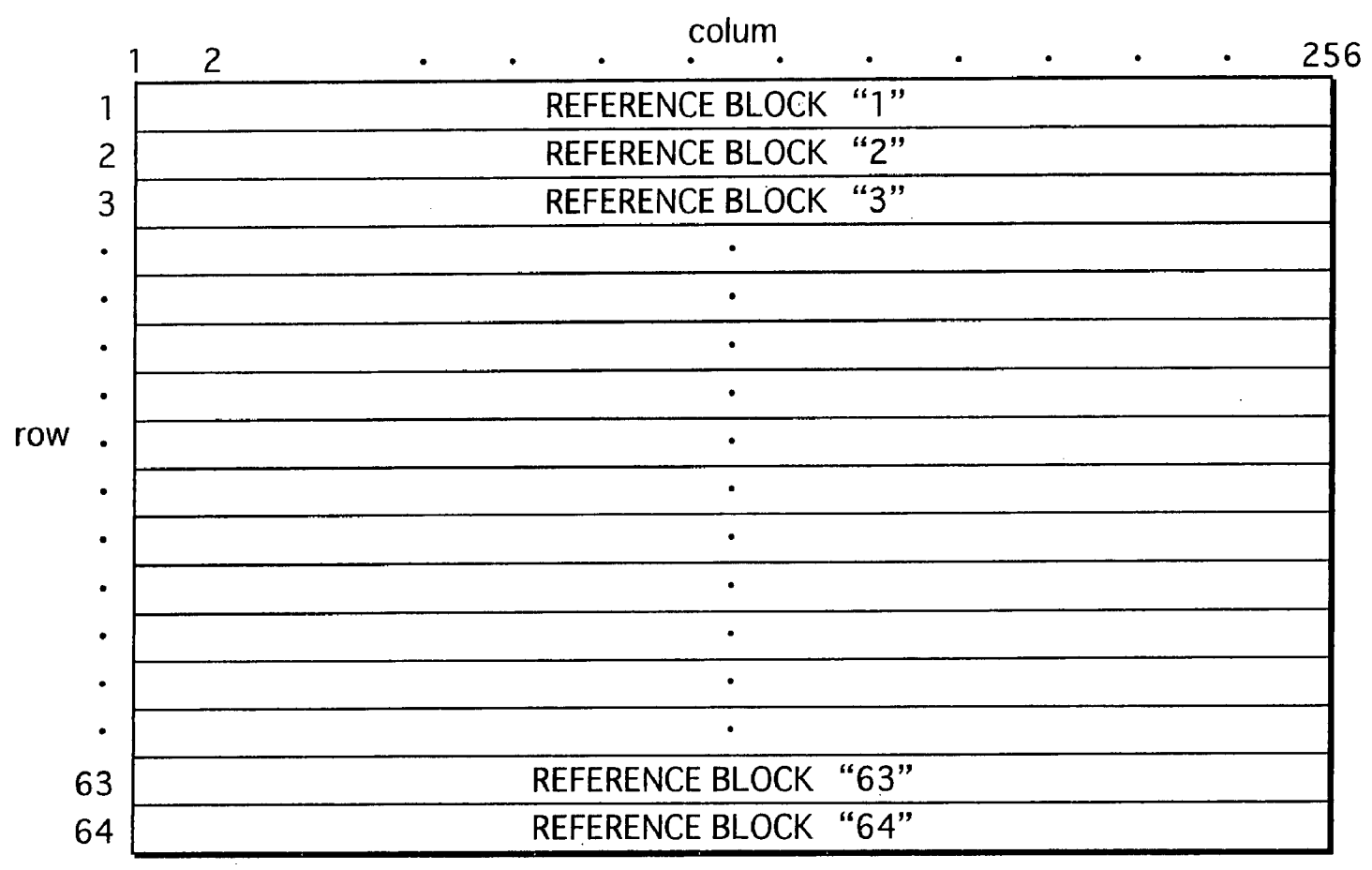

(A) As FIG. 22 shows, the reference frame memory 131 as an example consists of 16384 memory cells disposed in a shape of a matrix having 64 rows×256 columns. The positions of memory cells are specified by row addresses 1 to 64 and column addresses 1 to 256. Each memory cell has a capacity of 8 bytes. For simplification, a row address "r" (r=1 to 64) is represented by "row r", and a column address "c" (c=1 to 256) is represented by "column c".

Among 16 rows×16 columns of pixel data constituting the reference block "1", the sixteen pixels in the first row are stored in sixteen memory cells specified by row "1" and columns "1" to "16" respectively. The sixteen pixels in the second row are stored in sixteen memory cells specified by row "1" and columns "17" to "32" respectively. In this way, the pixel data in the $3^{rd}$ to $16^{th}$ rows are stored in the memory cells specified by row "1" and columns "33" to "256".

In the same way as the reference block "1", the pixel data constituting the reference block "2" is stored in the 256 memory cells specified by row "2" and columns "1" to "256".

In this way, the reference blocks "3" to "64" in the reference frame are stored in memory cells specified by rows "3" to "64" included in one column, each consisting of 256 memory cells.

(B) Addition Unit 124

The addition unit 124 outputs 16 rows×16 columns of pixel data to the reference frame memory 131 in the order from the 1st row to the 16th row.

Figure 23:
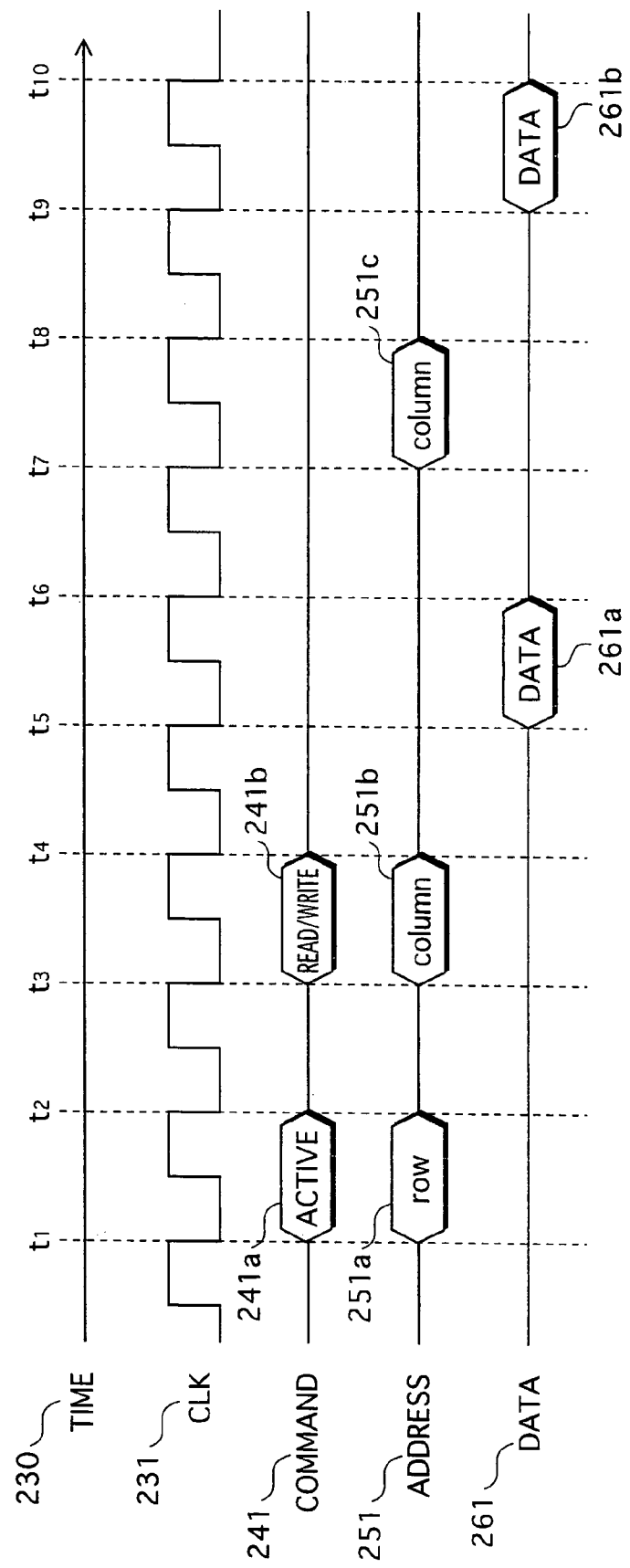
FIG. 23 shows, on a time line, a clock signal outputted to a reference frame memory, a type of an instruction, a type of an address, and pixel data input to/output from a reference frame memory 131 in the case where writing into/reading from the reference frame memory 131 is performed in a page mode.

As FIG. 23 shows, the addition unit 124 outputs an instruction 241, an address 251, and data 261 in synchronization with a clock signal 231.

An instruction 241a is for outputting an instruction "ACTIVE" indicating the start of the operation. An instruction 241b indicates an instruction for reading or writing outputted by the reference frame memory 131. When this instruction is for reading, "READ" is outputted, and when that is for writing, "WRITE" is outputted.

(i) Writing in Page Mode

Writing in page mode, in which memory cells in a row is accessed by fixing the row and outputting only the column, is described next with reference to FIG. 23.

The addition unit 124 outputs the instruction 241a (ACTIVE) indicating the start of the operation to the reference frame memory 131 at a time "t1". At the same time, the addition unit 124 outputs a row address 251a (row "1"), which is an address of a memory cell into which data is to be written.

The addition unit 124 outputs the instruction 241b (WRITE) at a time "t3". At the same time, the addition unit 124 outputs a column address 251b (column "1"), which is an address of a memory cell into which data is to be written.

The addition unit 124 outputs pixel data 261a at a time "t5".

The addition unit 124 outputs a column address 251c (column "2"), which is an address of a memory cell to be outputted next time, at a time "t7", and outputs pixel data 261b at a time "t9".

In the same way, by repeating the output of the column and pixel data in synchronization with the clock signal 231, pixel data are to be stored in memory cells specified by row "1" and columns "3" to "256". When 256 pieces of pixel data constituting the reference block "1" are respectively stored in 256 memory cells specified by row "1" and columns "1" to "256", the addition unit 124 outputs row "2". Then, the addition unit 124 performs the output of pixel data constituting the reference block "2".

In this way, the reference blocks "3" to "64" are outputted to the memory cells of rows "3" to "64" in the reference frame memory 131, and all the sixty-four reference blocks constituting the reference frame are outputted to the reference frame memory 131.

The following method (ii) is allowable as well.

(ii) Writing in Burst Mode

Writing in burst mode, in which only a row and a column of a memory cell where the access starts is outputted, and a plurality of succeeding memory cells are accessed after this output, is described next with reference to FIG. 24.

Figure 24:
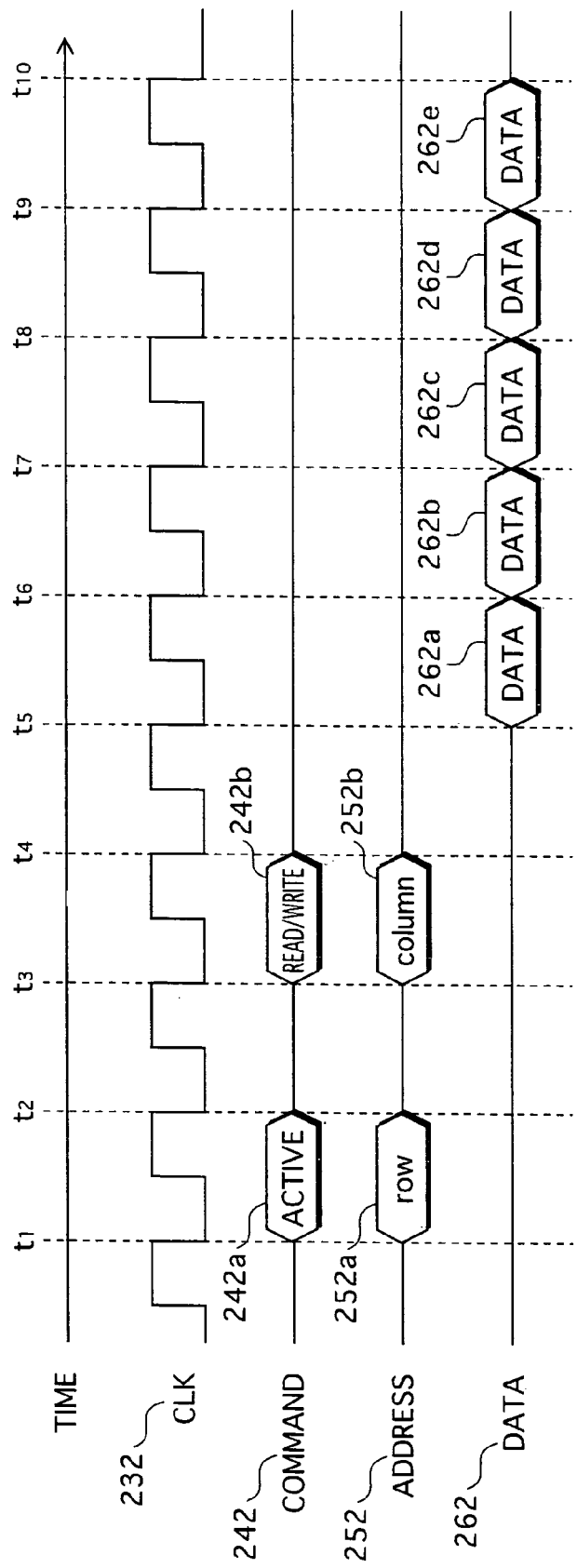
FIG. 24 shows, on a time line, a clock signal outputted to a reference frame memory, a type of an instruction, a type of an address, and pixel data input to/output from a reference frame memory 131 in the case where writing into/reading from the reference frame memory 131 is performed in a burst mode.

As FIG. 24 shows, the addition unit outputs an address 252 and a pixel data 262 to the reference frame memory 131 in synchronization with a clock signal 232.

An instruction 242a represents the output of the instruction "ACTIVE" which is an instruction indicating the start of the operation. An instruction 242b represents an instruction of the reading or the writing outputted to the reference frame memory 131. When the instruction is for the reading, the instruction 242b is "READ", and when the instruction is for the writing, the instruction 242b is "WRITE".

The addition unit 124 outputs the instruction 242a (ACTIVE) at a time "t1", and outputs the row address 252a of the writing destination memory cell (row "1") at the same time. Then, the addition unit 124 outputs the instruction 242b (WRITE) at a time "t3", and outputs the column address 252b of the writing destination memory cell (column "1") at the same time.

The addition unit 124 outputs pixel data 262a at a time "t5", and outputs pixel data 262b at a time "t6". In the same way, the addition unit 124 outputs pixel data 262c, 262d, 262e . . . in sequence in synchronization with a clock signal 232. The outputted pixel data 262a, 262b, 262c . . . are stored in memory cells respectively having row "1" and columns "1" to "256".

When all the pixel data constituting the reference block "1" are stored in the memory cells respectively having row "1" and columns "1" to "256", the addition unit 124 outputs row "2", and processing moves to the output of pixel data constituting the reference block "2".

In the same way, the reference blocks "3" to "64" are outputted to the memory cells of row "3" to "64" in the reference frame memory 131, and all the sixty-four reference blocks constituting the reference frame are written into the reference frame memory 131.

(C) Reference Frame Memory Control Unit 133

As described above, the reference frame memory control unit 133 selects a reference block, which is outputted from the reference frame memory 131 to the reference image data buffer 134 according to the block variable received from the motion detection control unit 132 and the PAT flag.

Then the reference frame memory control unit 133 reads the selected reference block from the reference frame memory 131 in the following manner.

As an example, a block variable "1" and a PAT flag "1010" is received here. In this case, the reference frame memory control unit 133 selects reference blocks "1", "2", "9", and "10", and reads them from the reference frame memory 131.

(i) Reading in Page Mode

The reading from the reference frame memory 131 by the reference frame memory control unit 133 is described next with reference to FIG. 23.

The reference frame memory control unit 133 outputs the instruction 241a (ACTIVE), which is an instruction indicating the start of the operation, to the reference frame memory 131 at a time "t1", and outputs the row address 251a of the reading source cell (row "1") at the same time.

The reference frame memory control unit 133 outputs the instruction 241b (READ) at a time "t3", and outputs the column address 251b of the reading source cell (column "1") at the same time.

The reference frame memory control unit 133 receives pixel data 261a at a time "t5".

The reference frame memory control unit 133 outputs a column address 251c (column "2"), which is an address of a memory cell to be read next time, at a time "t7", and receives pixel data 261b at a time "t9".

In this way, the reference frame memory control unit 133 receives pixel data stored in memory cells respectively having row "1" and columns "3" to "256", by repeating the output of columns and receiving the pixel data in synchronization with the clock signal 231.

When all the 256 pieces of pixel data constituting the reference block "1" are outputted from the 256 memory cells specified by row "1" and columns "1" to "256", the reference frame memory control unit 133 outputs row "2", and processing moves to the reading of the reference block "2" stored in 256 memory cells respectively having row "2" and columns "1" to "256".

After finishing the reading of the reference block "2", the reference frame memory control unit 133 reads the reference blocks "9" and "10" in the same way.

The following method (ii) is allowable as well.

(ii) Reading in Burst Mode

Reading from the reference frame memory 131 in burst mode is described next with reference to FIG. 24.

The reference frame memory control unit 133 outputs the instruction 242a (ACTIVE) at a time "t1", and outputs the row address 252a (row "1") of the reading source memory cell (row "1") at the same time. Then, the reference frame memory control unit 133 outputs the instruction 242b (READ) at a time "t3", and outputs the column address 252b of the reading source memory cell (column "1") at the same time.

The reference frame memory control unit 133 receives pixel data 262a at a time "t5", and receives pixel data 262b at a time "t6". In this way, the reference frame memory control unit 133 receives pixel data 262c, 262d, 262e . . . in sequence in synchronization with a clock signal 232. When all the 256 pieces of pixel data constituting the reference block "1" stored in the 256 memory cells respectively having row "1" and columns "1" to "256" are outputted, the reference frame memory control unit 133 outputs row "2", and processing moves to the reading of 256 pieces of pixel data respectively having columns "1" to "256" constituting the reference block "2".

After finishing the reading of the reference block "2", the reference frame memory control unit 133 reads the reference blocks "9" and "10" from the reference frame memory 131 in the same way.

(D) Effects of Modification (1)

(i) In the case of performing the reading and the writing in the page mode, when reading or writing memory cells for one column, the addition unit 124 or the reference frame memory control unit 133 is not required to output rows of the memory cells respectively having columns "2" to "256". Therefore, the output of rows of 255 memory cells can be omitted.

(ii) In the case of performing the reading and the writing in the burst mode, after finishing the row specifying the top memory cell of memory cells for one column and column "1" is outputted, the addition unit 124 or the reference frame memory control unit 133 is not required to output addresses of succeeding columns "2" to "256". Therefore, the output of rows and columns of 255 memory cells can be omitted.

By the omission of the output of addresses, time required for the reading and the writing can be reduced.

(2) In the above-described first embodiment, the reference image data buffer 134 consists of four memories "141" to "144", and these memories are connected to the reference frame memory 131 and the motion detection control unit 132 by individual busses respectively. However, this is an example structure, and other structures may be used.

For instance, the reference image data buffer 134 may consist of twelve block areas disposed in a shape of a matrix having 3 rows and 4 columns, and may have a port for reading and a port for writing. The reference image data buffer 134 may be connected to the motion detection control unit 132 and the reference frame memory 131 by one bus. As described in the first embodiment, the reading is performed from the detection area in the reference image data buffer 134, and the writing is performed to a block area which is outside of the detection area. Therefore, the reading and the writing never occur in one block area at the same time.

Also in the second embodiment, the reference image data buffer 134b may consist of fifteen block areas disposed in a shape of a matrix having 3 rows and 5 columns, and may have a port for reading and a port for writing. The reference image data buffer 134b may be connected to the motion detection control unit 132b and the reference frame memory 131 by one bus.

(3) In the above-described embodiments, the reference area on the reference frame is reference blocks having 3 rows and 3 columns, in which a reference block having the same block number as the object block of the motion vector detection is included in the center. However, the reference area may be reference blocks having 5 rows and 5 columns.

In this case, the reference image data buffer 134 consists of block areas disposed in a shape of a matrix having 5 rows and 6 columns.

The motion vector detection is performed in the same way as the first embodiment.

(4) The present invention may be the method described above. Also, the present invention may be a combination of the above-described embodiments and the above-described modification.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

INDUSTRIAL APPLICABILITY

The present invention is applicable to industries which produce and distribute devices having a moving picture camera function, such as digital cameras and camera-equipped portable telephones, and to industries which create or use image contents, such as the cinema industry and the media industry, in a managerial, continuous, and repetitive manner.

What is claimed is:

1. A motion vector detection device that detects a motion vector of an object block included in an object frame with reference to a reference frame, comprising:

a reference frame storing unit operable to store a reference frame consisting of a predetermined number of reference blocks;

an object block storing unit operable to store an object block included in an object frame;

a reference block storing unit including a single reference area for storing a plurality of reference blocks, the reference area being dynamically dividable into a detection frame and a transfer frame without overlapping, the detection frame being provided for storing a plurality of reference blocks to be used in detection of a motion vector of the object block, and the transfer frame being provided for storing a reference block to be written next;

a writing unit operable to read, among a plurality of reference blocks including a reference block corresponding to a succeeding object block, one or more reference blocks that are not stored in the detection frame, and write the read reference blocks into the transfer frame, the succeeding object block adjoining the object block; and a detection unit operable to detect a motion vector of the object block with reference to the reference blocks stored in the detection frame, in parallel with the writing of the reference blocks into the transfer frame performed by the writing unit, wherein:

after detecting the motion vector, the detection unit shifts the detection frame by a single block within the reference area, and determines the shifted detection frame as a new detection frame, after the detection unit determines the detection frame, the writing unit reads, among a plurality of reference blocks including a reference block corresponding to a third object block, one or more reference blocks that are not stored in the new detection frame, and writes the read reference blocks into a new transfer frame, the third object block adjoining the succeeding object block, and the new transfer frame being consisted of an area within the reference area excluding the new detection frame, and the detection unit detects a motion vector of the succeeding object block with reference to the reference blocks stored in the new detection frame, in parallel with the writing of the reference blocks into the new transfer frame performed by the writing unit.

2. A motion vector detection device that detects a motion vector of an object block included in an object frame based on a reference frame, comprising:

a reference frame storing unit operable to store a reference frame consisting of a predetermined number of reference blocks;

an object block storing unit operable to store an object block included in an object frame;

a reference block storing unit including a single reference area for storing a plurality of reference blocks;

a setting unit operable to dynamically set, within the reference area of the reference block storing unit, a detection frame for the plurality of reference blocks used in detection of a motion vector of the object block and a transfer frame for a reference block to be rewritten next, based on a position of the object block in the object frame;

a writing unit operable to read, among a plurality of reference blocks including a reference block corresponding to a succeeding object block, one or more reference blocks that are not stored in the detection frame, and write the read reference blocks into the transfer frame, the succeeding object block adjoining the object block; and a detection unit operable to detect a motion vector of the object block based on the reference blocks stored in the detection frame, in parallel with the writing of the reference blocks into the transfer frame performed by the writing unit, wherein:

after detecting the motion vector, the detection unit shifts the detection frame by a single block within the reference area, and determines the shifted detection frame as a new detection frame, after the detection unit determines the detection frame, the writing unit reads, among a plurality of reference blocks including a reference block corresponding to a third object block, one or more reference blocks that are not stored in the new detection frame, and writes the read reference blocks into a new transfer frame, the third object block adjoining the succeeding object block, and the new transfer frame being consisted of an area within the reference area excluding the new detection frame, and the detection unit detects a motion vector of the succeeding object block with reference to the reference blocks stored in the new detection frame, in parallel with the writing of the reference blocks into the new transfer frame performed by the writing unit.

3. The motion vector detection device of claim 2, wherein the setting unit sets the detection frame so that the reference block corresponding to the object block is placed in the center of the detection frame.

4. The motion vector detection device of claim 3, wherein each reference block stored in the reference block storing unit is identified by a physical address indicating a position of the reference block stored in the reference block storing unit, and the detection unit includes:

a specification unit operable to specify a logical address indicating a position of the reference block in the detection frame;

a conversion unit operable to convert the logical address into the physical address;

a reading unit operable to read the reference block identified by the physical address from the reference block storing unit per pixel;

a repeat control unit operable to control the specification unit, the conversion unit, and the reading unit repeatedly to perform the specification, the conversion, and the reading on all the reference blocks in the detection frame; and a calculation unit operable to calculate the motion vector of the object block with use of the read reference block and the object block.

5. The motion vector detection device of claim 4, wherein the reference block storing unit stores the plurality of reference blocks including the reference block corresponding to the object block that adjoins an edge of the object frame, the setting unit sets the plurality of reference blocks including the reference block corresponding to the object block as a calculation range in the detection frame, and the detection unit detects the motion vector based on the reference blocks included in the calculation range in the detection frame.

6. The motion vector detection device of claim 2, wherein the reference frame storing unit includes a plurality of memory elements disposed in a shape of a matrix, a position of each memory element being specified by a row address and a column address, each reference block constituting the reference frame being stored in a plurality of memory elements whose positions are specified by a same row address, and the writing unit reads the reference block from the plurality of the memory elements whose positions are specified by the same row address.

7. The motion vector detection device of claim 2, wherein the reference block storing unit includes an area for storing 3 rows and 4 columns of the reference blocks, and the setting unit sets the detection frame for storing 3 rows and 3 columns of the reference blocks, and the transfer frame for storing 3 rows and 1 column of the reference blocks.

8. The motion vector detection device of claim 3, wherein the reference block storing unit includes an area for storing 3 rows and 5 columns of the reference blocks, and the setting unit sets the detection frame for storing 3 rows and 3 columns of the reference blocks, and the transfer frame for storing 3 rows and 2 columns of the reference blocks.

9. A motion vector detection method for use buy a motion vector detection device that comprises: a reference frame storing unit operable to store a reference frame consisting of a predetermined number of reference blocks; an object block storing unit operable to store an object block including in an object frame; and a reference block storing unit including a single reference area for storing a plurality of reference blocks, the motion vector detection method comprising:

a setting step of dynamically setting by the motion vector detection device, within the reference area of the reference block storing unit, a detection frame for the plurality of reference blocks used in detection of a motion vector of the object block and a transfer frame for a reference block to be written next, based on a position of the object block in the object frame;

a writing step of reading by the motion vector detection device, among a plurality of reference blocks including a reference block corresponding to a succeeding object block, one or more reference blocks that are not stored in the detection frame, and writing the read reference blocks into the transfer frame, the succeeding object block adjoining the object block;

a detection step of detecting by the motion vector detection device, a motion vector of the object block based on the reference blocks stored in the detection frame, in parallel with the writing of the reference blocks into the transfer frame performed in the writing step;

after detecting the motion vector, shifting the detection frame by a single block within the reference area, and determining the shifted detection frame as a new detection frame;

after determining the detection frame, reading, among a plurality of reference blocks including a reference block corresponding to a third object block, one or more reference blocks that are not stored in the new detection frame, and writing the read reference blocks into a new transfer frame, the third object block adjoining the succeeding object block, and the new transfer frame being consisted of an area within the reference area excluding the new detection frame; and detecting a motion vector of the succeeding object block with reference to the reference blocks stored in the new detection frame, in parallel with the writing of the reference blocks into the new transfer frame performed in the writing step.

10. A moving picture camera that compresses an object block included in an object frame with use of a motion-compensated prediction based on a reference frame, comprising:

a reference frame storing unit operable to store a reference frame consisting of a predetermined number of reference blocks;

an object block storing unit operable to store an object block included in an object frame;

a reference block storing unit including a single reference area for storing a plurality of reference blocks;

a setting unit operable to dynamically setting, within the reference area of the reference block storing unit, a detection frame for the plurality of reference blocks used in detection of a motion vector of the object block and a transfer frame for a reference block to be written next, based on a position of the object block in the object frame;

a writing unit operable to read, among a plurality of reference blocks including a reference block corresponding to a succeeding object block, one or more reference blocks that are not stored in the detection frame, and write the read reference blocks into the transfer frame, the succeeding object block adjoining the object block; and a detection unit operable to detect a motion vector of the object block based on the reference block stored in the detection frame, in parallel with the writing of the reference blocks into the transfer frame performed by the writing unit, wherein:

after detecting the motion vector, the detection unit shifts the detection frame by a single block within the reference area, and determines the shifted detection frame as a new detection frame, after the detection unit determines the detection frame, the writing unit reads, among a plurality of reference blocks including a reference block corresponding to a third object block, one or more reference blocks that are not stored in the new detection frame, and writes the read reference blocks into a new transfer frame, the third object block adjoining the succeeding object block, and the new transfer frame being consisted of an area within the reference area excluding the new detection frame, and the detection unit detects a motion vector of the succeeding object block with reference to the reference blocks stored in the new detection frame, in parallel with the writing of the reference blocks into the new transfer frame performed by the writing unit.

* * * * *

UNITED STATES PATENT AND TRADEMARK OFFICE
CERTIFICATE OF CORRECTION

| | |
|---|---|
| PATENT NO. | : 7,627,036 B2 |
| APPLICATION NO. | : 11/000973 |
| DATED | : December 1, 2009 |
| INVENTOR(S) | : Takakura et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1379 days.

Signed and Sealed this

Second Day of November, 2010

David J. Kappos
*Director of the United States Patent and Trademark Office*